(12) United States Patent
Toscano et al.

(10) Patent No.: US 8,160,739 B2
(45) Date of Patent: Apr. 17, 2012

(54) TRANSFERRING STORAGE DEVICES WITHIN STORAGE DEVICE TESTING SYSTEMS

(75) Inventors: John Toscano, Auburn, MA (US); Evgeny Polyakov, Brookline, MA (US); Edward Garcia, Holbrook, MA (US); Eric L. Truebenbach, Sudbury, MA (US); Brian S. Merrow, Harvard, MA (US); Brian J. Whitaker, Johnstown, CO (US)

(73) Assignee: Teradyne, Inc., North Reading, MA (US)

( * ) Notice: Subject to any disclaimer, the term of this patent is extended or adjusted under 35 U.S.C. 154(b) by 498 days.

(21) Appl. No.: 12/424,980

(22) Filed: Apr. 16, 2009

(65) Prior Publication Data

US 2009/0265032 A1 Oct. 22, 2009

Related U.S. Application Data

(63) Continuation-in-part of application No. 12/104,536, filed on Apr. 17, 2008.

(51) Int. Cl.
*G06F 7/00* (2006.01)
*G11B 21/08* (2006.01)
*G11B 7/085* (2006.01)

(52) U.S. Cl. ............... 700/214; 700/228; 369/30.48
(58) Field of Classification Search .......... 700/214, 700/213, 228; 369/30.48, 30.56, 30.5, 30.6, 369/30.71, 30.42, 30.55, 30.86, 30.28
See application file for complete search history.

(56) References Cited

U.S. PATENT DOCUMENTS

| | | |
|---|---|---|
| 577,186 A | 3/1896 | Cahill |
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |

(Continued)

FOREIGN PATENT DOCUMENTS

AU 583716 5/1989

(Continued)

OTHER PUBLICATIONS

Cardinal Intellectual Property's search report including the results of a search for the features of the claims included in the U.S. patent application entitled "Vibration Isolation Within Disk Drive Testing Systems," inventors: Brian S. Merrow and having assigned asssigned U.S. Appl. No. 12/767,142. The foregoing U.S. patent application is a continuation of U.S. Appl. No. 12/105,105. Revised Mar. 30, 2010.

(Continued)

*Primary Examiner* — Ramya Burgess
(74) *Attorney, Agent, or Firm* — Fish & Richardson P.C.

(57) ABSTRACT

A method of transferring storage devices within a storage device testing system includes actuating an automated transporter to substantially simultaneously retrieve multiple storage devices presented for testing, and actuating the automated transporter to substantially simultaneously deliver each retrieved storage device to a respective test slot of the storage device testing system and substantially simultaneously insert each storage device in the respective test slot.

30 Claims, 17 Drawing Sheets

U.S. PATENT DOCUMENTS

| | | |
|---|---|---|
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,220,548 A * | 6/1993 | Nakatsukasa et al. ..... 369/30.45 |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bologna |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 | 1/2001 | Paek et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bolognia et al. |
| 6,304,839 B1 | 10/2001 | Ho et al. |

| | | | | | | |
|---|---|---|---|---|---|---|
| 6,307,386 B1 | 10/2001 | Fowler et al. | 6,982,872 B2 | 1/2006 | Behl et al. | |
| 6,327,150 B1 | 12/2001 | Levy et al. | 7,006,325 B2 | 2/2006 | Emberty et al. | |
| 6,330,154 B1 | 12/2001 | Fryers et al. | 7,039,924 B2 | 5/2006 | Goodman et al. | |
| 6,351,379 B1 | 2/2002 | Cheng | 7,054,150 B2 * | 5/2006 | Orriss et al. | 361/679.33 |
| 6,354,792 B1 | 3/2002 | Kobayashi et al. | 7,070,323 B2 | 7/2006 | Wanek et al. | |
| 6,356,409 B1 | 3/2002 | Price et al. | 7,076,391 B1 | 7/2006 | Pakzad et al. | |
| 6,356,415 B1 | 3/2002 | Kabasawa | 7,077,614 B1 | 7/2006 | Hasper et al. | |
| 6,384,995 B1 | 5/2002 | Smith | 7,088,541 B2 | 8/2006 | Orriss et al. | |
| 6,388,437 B1 | 5/2002 | Wolski et al. | 7,092,251 B1 | 8/2006 | Henry | |
| 6,388,875 B1 | 5/2002 | Chen | 7,106,582 B2 | 9/2006 | Albrecht et al. | |
| 6,388,878 B1 | 5/2002 | Chang | 7,123,477 B2 | 10/2006 | Coglitore et al. | |
| 6,389,225 B1 | 5/2002 | Malinoski et al. | 7,126,777 B2 | 10/2006 | Flechsig et al. | |
| 6,411,584 B2 | 6/2002 | Davis et al. | 7,130,138 B2 | 10/2006 | Lum et al. | |
| 6,421,236 B1 | 7/2002 | Montoya et al. | 7,134,553 B2 | 11/2006 | Stephens | |
| 6,434,000 B1 | 8/2002 | Pandolfi | 7,139,145 B1 | 11/2006 | Archibald et al. | |
| 6,434,498 B1 | 8/2002 | Ulrich et al. | 7,164,579 B1 | 1/2007 | Muncaster et al. | |
| 6,434,499 B1 | 8/2002 | Ulrich et al. | 7,167,360 B2 | 1/2007 | Inoue et al. | |
| 6,464,080 B1 | 10/2002 | Morris et al. | 7,181,458 B1 | 2/2007 | Higashi | |
| 6,467,153 B2 | 10/2002 | Butts et al. | 7,203,021 B1 | 4/2007 | Ryan et al. | |
| 6,473,297 B1 | 10/2002 | Behl et al. | 7,203,060 B2 | 4/2007 | Kay et al. | |
| 6,473,301 B1 | 10/2002 | Levy et al. | 7,206,201 B2 | 4/2007 | Behl et al. | |
| 6,476,627 B1 | 11/2002 | Pelissier et al. | 7,216,968 B2 | 5/2007 | Smith et al. | |
| 6,477,044 B2 | 11/2002 | Foley et al. | 7,219,028 B2 | 5/2007 | Bae et al. | |
| 6,477,442 B1 | 11/2002 | Valerino, Sr. | 7,219,273 B2 | 5/2007 | Fisher et al. | |
| 6,480,380 B1 | 11/2002 | French et al. | 7,227,746 B2 | 6/2007 | Tanaka et al. | |
| 6,480,382 B2 | 11/2002 | Cheng | 7,232,101 B2 | 6/2007 | Wanek et al. | |
| 6,487,071 B1 | 11/2002 | Tata et al. | 7,243,043 B2 | 7/2007 | Shin | |
| 6,489,793 B2 | 12/2002 | Jones et al. | 7,248,467 B2 | 7/2007 | Sri-Jayantha et al. | |
| 6,494,663 B2 | 12/2002 | Ostwald et al. | 7,259,966 B2 | 8/2007 | Connelly, Jr. et al. | |
| 6,525,933 B2 | 2/2003 | Eland | 7,273,344 B2 | 9/2007 | Ostwald et al. | |
| 6,526,841 B1 | 3/2003 | Wanek et al. | 7,280,353 B2 | 10/2007 | Wendel et al. | |
| 6,535,384 B2 | 3/2003 | Huang | 7,289,885 B2 | 10/2007 | Basham et al. | |
| 6,537,013 B2 | 3/2003 | Emberty et al. | 7,304,855 B1 | 12/2007 | Milligan et al. | |
| 6,544,309 B1 | 4/2003 | Hoefer et al. | 7,315,447 B2 | 1/2008 | Inoue et al. | |
| 6,546,445 B1 | 4/2003 | Hayes | 7,349,205 B2 | 3/2008 | Hall et al. | |
| 6,553,532 B1 | 4/2003 | Aoki | 7,353,524 B1 | 4/2008 | Lin et al. | |
| 6,560,107 B1 | 5/2003 | Beck et al. | 7,385,385 B2 | 6/2008 | Magliocco et al. | |
| 6,565,163 B2 | 5/2003 | Behl et al. | 7,395,133 B2 | 7/2008 | Lowe | |
| 6,566,859 B2 | 5/2003 | Wolski et al. | 7,403,451 B2 * | 7/2008 | Goodman et al. | 369/30.01 |
| 6,567,266 B2 | 5/2003 | Ives et al. | 7,437,212 B2 | 10/2008 | Farchmin et al. | |
| 6,570,734 B2 | 5/2003 | Ostwald et al. | 7,447,011 B2 | 11/2008 | Wade et al. | |
| 6,577,586 B1 | 6/2003 | Yang et al. | 7,457,112 B2 | 11/2008 | Fukuda et al. | |
| 6,577,687 B2 | 6/2003 | Hall et al. | 7,467,024 B2 | 12/2008 | Flitsch | |
| 6,618,254 B1 | 9/2003 | Ives | 7,476,362 B2 | 1/2009 | Angros | |
| 6,626,846 B2 | 9/2003 | Spencer | 7,483,269 B1 | 1/2009 | Marvin, Jr. et al. | |
| 6,628,518 B2 | 9/2003 | Behl et al. | 7,505,264 B2 | 3/2009 | Hall et al. | |
| 6,635,115 B1 | 10/2003 | Fairbairn et al. | 7,554,811 B2 | 6/2009 | Scicluna et al. | |
| 6,640,235 B1 | 10/2003 | Anderson | 7,568,122 B2 | 7/2009 | Mechalke et al. | |
| 6,644,982 B1 | 11/2003 | Ondricek et al. | 7,570,455 B2 | 8/2009 | Deguchi et al. | |
| 6,651,192 B1 | 11/2003 | Viglione et al. | 7,573,715 B2 | 8/2009 | Mojaver et al. | |
| 6,654,240 B1 | 11/2003 | Tseng et al. | 7,584,851 B2 | 9/2009 | Hong et al. | |
| 6,679,128 B2 | 1/2004 | Wanek et al. | 7,612,996 B2 | 11/2009 | Atkins et al. | |
| 6,693,757 B2 | 2/2004 | Hayakawa et al. | 7,625,027 B2 | 12/2009 | Kiaie et al. | |
| 6,741,529 B1 | 5/2004 | Getreuer | 7,630,196 B2 | 12/2009 | Hall et al. | |
| 6,746,648 B1 | 6/2004 | Mattila et al. | 7,643,289 B2 | 1/2010 | Ye et al. | |
| 6,751,093 B1 | 6/2004 | Hsu et al. | 7,646,596 B2 | 1/2010 | Ng | |
| 6,791,785 B1 | 9/2004 | Messenger et al. | 7,729,107 B2 | 6/2010 | Atkins et al. | |
| 6,791,799 B2 | 9/2004 | Fletcher | 2001/0006453 A1 | 7/2001 | Glorioso et al. | |
| 6,798,651 B2 | 9/2004 | Syring et al. | 2001/0044023 A1 | 11/2001 | Johnson et al. | |
| 6,798,972 B1 | 9/2004 | Ito et al. | 2001/0046118 A1 | 11/2001 | Yamanashi et al. | |
| 6,801,834 B1 | 10/2004 | Konshak et al. | 2001/0048590 A1 | 12/2001 | Behl et al. | |
| 6,806,700 B2 | 10/2004 | Wanek et al. | 2002/0030981 A1 | 3/2002 | Sullivan et al. | |
| 6,811,427 B2 | 11/2004 | Garrett et al. | 2002/0044416 A1 | 4/2002 | Harmon, III et al. | |
| 6,826,046 B1 | 11/2004 | Muncaster et al. | 2002/0051338 A1 | 5/2002 | Jiang et al. | |
| 6,830,372 B2 | 12/2004 | Liu et al. | 2002/0071248 A1 | 6/2002 | Huang et al. | |
| 6,832,929 B2 | 12/2004 | Garrett et al. | 2002/0079422 A1 | 6/2002 | Jiang | |
| 6,861,861 B2 | 3/2005 | Song et al. | 2002/0090320 A1 | 7/2002 | Burow et al. | |
| 6,862,173 B1 | 3/2005 | Konshak et al. | 2002/0116087 A1 | 8/2002 | Brown | |
| 6,867,939 B2 | 3/2005 | Katahara et al. | 2002/0161971 A1 | 10/2002 | Dimitri et al. | |
| 6,892,328 B2 | 5/2005 | Klein et al. | 2002/0172004 A1 | 11/2002 | Ives et al. | |
| 6,904,479 B2 | 6/2005 | Hall et al. | 2003/0035271 A1 | 2/2003 | Lelong et al. | |
| 6,908,330 B2 | 6/2005 | Garrett et al. | 2003/0043550 A1 | 3/2003 | Ives | |
| 6,928,336 B2 | 8/2005 | Peshkin et al. | 2003/0206397 A1 | 11/2003 | Allgeyer et al. | |
| 6,937,432 B2 | 8/2005 | Sri-Jayantha et al. | 2004/0165489 A1 | 8/2004 | Goodman et al. | |
| 6,957,291 B2 | 10/2005 | Moon et al. | 2004/0230399 A1 | 11/2004 | Shin | |
| 6,965,811 B2 | 11/2005 | Dickey et al. | 2004/0236465 A1 | 11/2004 | Butka et al. | |
| 6,974,017 B2 | 12/2005 | Oseguera | 2004/0264121 A1 | 12/2004 | Orriss et al. | |
| 6,976,190 B1 | 12/2005 | Goldstone | 2005/0004703 A1 | 1/2005 | Christie | |
| 6,980,381 B2 | 12/2005 | Gray et al. | 2005/0010836 A1 | 1/2005 | Bae et al. | |

| | | | | | |
|---|---|---|---|---|---|
| 2005/0018397 A1 | 1/2005 | Kay et al. | EP | 0617570 | 9/1994 |
| 2005/0055601 A1 | 3/2005 | Wilson et al. | EP | 0635836 | 1/1995 |
| 2005/0057849 A1 | 3/2005 | Twogood et al. | EP | 741508 | 11/1996 |
| 2005/0069400 A1 | 3/2005 | Dickey et al. | EP | 0757320 | 2/1997 |
| 2005/0109131 A1 | 5/2005 | Wanek et al. | EP | 0757351 | 2/1997 |
| 2005/0116702 A1 | 6/2005 | Wanek et al. | EP | 0840476 | 5/1998 |
| 2005/0131578 A1 | 6/2005 | Weaver | EP | 1 045 301 A | 10/2000 |
| 2005/0179457 A1 | 8/2005 | Min et al. | EP | 1209557 | 5/2002 |
| 2005/0207059 A1 | 9/2005 | Cochrane | EP | 1422713 | 5/2004 |
| 2005/0219809 A1 | 10/2005 | Muncaster et al. | EP | 1234308 | 5/2006 |
| 2005/0225338 A1 | 10/2005 | Sands et al. | EP | 1760722 | 3/2007 |
| 2005/0270737 A1 | 12/2005 | Wilson et al. | EP | 1612798 | 11/2007 |
| 2006/0023331 A1 | 2/2006 | Flechsig et al. | GB | 2241118 | 8/1991 |
| 2006/0028802 A1 | 2/2006 | Shaw et al. | GB | 2276275 | 9/1994 |
| 2006/0058912 A1* | 3/2006 | Karlen ............ 700/214 | GB | 2299436 | 10/1996 |
| 2006/0066974 A1 | 3/2006 | Akamatsu et al. | GB | 2312984 | 11/1997 |
| 2006/0130316 A1 | 6/2006 | Takase et al. | GB | 2328782 | 3/1999 |
| 2006/0190205 A1 | 8/2006 | Klein et al. | GB | 2439844 | 7/2008 |
| 2006/0227517 A1 | 10/2006 | Zayas et al. | JP | 61-115279 | 6/1986 |
| 2006/0250766 A1 | 11/2006 | Blaalid et al. | JP | 62-177621 | 8/1987 |
| 2006/0269384 A1 | 11/2006 | Kiaie et al. | JP | 62-239394 | 10/1987 |
| 2007/0034368 A1 | 2/2007 | Atkins et al. | JP | 62-251915 | 11/1987 |
| 2007/0035874 A1 | 2/2007 | Wendel et al. | JP | 63-002160 | 1/1988 |
| 2007/0035875 A1 | 2/2007 | Hall et al. | JP | 63-004483 | 1/1988 |
| 2007/0053154 A1 | 3/2007 | Fukuda et al. | JP | 63-016482 | 1/1988 |
| 2007/0082907 A1 | 4/2007 | Canada et al. | JP | 63-062057 | 3/1988 |
| 2007/0127202 A1 | 6/2007 | Scicluna et al. | JP | 63-201946 | 8/1988 |
| 2007/0127206 A1 | 6/2007 | Wade et al. | JP | 63-214972 | 9/1988 |
| 2007/0195497 A1 | 8/2007 | Atkins | JP | 63-269376 | 11/1988 |
| 2007/0248142 A1 | 10/2007 | Rountree et al. | JP | 63-195697 | 12/1988 |
| 2007/0253157 A1 | 11/2007 | Atkins et al. | JP | 64-089034 | 4/1989 |
| 2007/0286045 A1 | 12/2007 | Onagi et al. | JP | 2-091565 | 3/1990 |
| 2008/0007865 A1 | 1/2008 | Orriss et al. | JP | 2-098197 | 4/1990 |
| 2008/0030945 A1 | 2/2008 | Mojaver et al. | JP | 2-185784 | 7/1990 |
| 2008/0112075 A1 | 5/2008 | Farquhar et al. | JP | 2-199690 | 8/1990 |
| 2008/0239564 A1 | 10/2008 | Farquhar et al. | JP | 2-278375 | 11/1990 |
| 2008/0282275 A1 | 11/2008 | Zaczek et al. | JP | 2-297770 | 12/1990 |
| 2008/0282278 A1 | 11/2008 | Barkley | JP | 3-008086 | 1/1991 |
| 2009/0028669 A1 | 1/2009 | Rebstock | JP | 3-078160 | 4/1991 |
| 2009/0082907 A1 | 3/2009 | Stuvel et al. | JP | 3-105704 | 5/1991 |
| 2009/0122443 A1 | 5/2009 | Farquhar et al. | JP | 3-207947 | 9/1991 |
| 2009/0142169 A1 | 6/2009 | Garcia et al. | JP | 3-210662 | 9/1991 |
| 2009/0153992 A1 | 6/2009 | Garcia et al. | JP | 3-212859 | 9/1991 |
| 2009/0153993 A1 | 6/2009 | Garcia et al. | JP | 3-214490 | 9/1991 |
| 2009/0153994 A1 | 6/2009 | Merrow | JP | 3-240821 | 10/1991 |
| 2009/0175705 A1 | 7/2009 | Nakao et al. | JP | 3-295071 | 12/1991 |
| 2009/0261047 A1 | 10/2009 | Merrow | JP | 4-017134 | 1/1992 |
| 2009/0261228 A1 | 10/2009 | Merrow | JP | 4-143989 | 5/1992 |
| 2009/0261229 A1 | 10/2009 | Merrow | JP | 4-172658 | 6/1992 |
| 2009/0262444 A1 | 10/2009 | Polyakov et al. | JP | 4-214288 | 8/1992 |
| 2009/0262445 A1 | 10/2009 | Noble et al. | JP | 4-247385 | 9/1992 |
| 2009/0262454 A1 | 10/2009 | Merrow | JP | 4-259956 | 9/1992 |
| 2009/0262455 A1 | 10/2009 | Merrow | JP | 4-307440 | 10/1992 |
| 2009/0265032 A1 | 10/2009 | Toscano et al. | JP | 4-325923 | 11/1992 |
| 2009/0265043 A1 | 10/2009 | Merrow | JP | 5-035053 | 2/1993 |
| 2009/0265136 A1 | 10/2009 | Garcia et al. | JP | 5-035415 | 2/1993 |
| 2009/0297328 A1 | 12/2009 | Slocum, III | JP | 5-066896 | 3/1993 |
| | | | JP | 5-068257 | 3/1993 |
| FOREIGN PATENT DOCUMENTS | | | JP | 5-073803 | 3/1993 |
| CN | 1177187 | 3/1998 | JP | 5-0753566 | 3/1993 |
| CN | 2341188 | 9/1999 | JP | 5-101603 | 4/1993 |
| CN | 1114109 | 7/2003 | JP | 5-173718 | 7/1993 |
| CN | 1192544 | 3/2005 | JP | 5-189163 | 7/1993 |
| DE | 3786944 | 11/1993 | JP | 5-204725 | 8/1993 |
| DE | 69111634 | 5/1996 | JP | 5-223551 | 8/1993 |
| DE | 69400145 | 10/1996 | JP | 6-004220 | 1/1994 |
| DE | 19701548 | 8/1997 | JP | 6-004981 | 1/1994 |
| DE | 19804813 | 9/1998 | JP | 6-162645 | 6/1994 |
| DE | 69614460 | 6/2002 | JP | 6-181561 | 6/1994 |
| DE | 69626584 | 12/2003 | JP | 6-215515 | 8/1994 |
| DE | 19861388 | 8/2007 | JP | 6-274943 | 9/1994 |
| EP | 0210497 | 7/1986 | JP | 6-314173 | 11/1994 |
| EP | 0242970 | 10/1987 | JP | 7-007321 | 1/1995 |
| EP | 0 277 634 A | 8/1988 | JP | 7-029364 | 1/1995 |
| EP | 0356977 | 8/1989 | JP | 7-037376 | 2/1995 |
| EP | 0442642 | 2/1991 | JP | 7-056654 | 3/1995 |
| EP | 0466073 | 7/1991 | JP | 7-111078 | 4/1995 |
| EP | 0776009 | 11/1991 | JP | 7-115497 | 5/1995 |
| EP | 0582017 | 2/1994 | JP | 7-201082 | 8/1995 |

| | | |
|---|---|---|
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 2/1989 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Cardinal Intellectual Property's search report including the results of a search for the features of the claims included in the U.S. patent application entitled "Disk Drive Clamping Transport and Testing," inventors: Brian S. Merrow et al., and having assigned asssigned U.S. Appl. No. 12/766,680. The foregoing U.S. patent application is a continuation of U.S. Appl. No. 11/959,133. Revised Apr. 1, 2010.

Fish & Richardson P.C., Request for Reconsideration in response to the Decision on Petition to Make Special for New Application Under 37 C.F.R. 1.102 in U.S. Appl. No. 12/727,201, Request filed on Jun. 11, 2010, 3 pages.

Fish & Richardson P.C., Accelerated Examination Support Document and Accompanying Table 1 in U.S. Appl. No. 12/727,201, filed on Jun. 11, 2010, 24 pages.

Exhibit 1 in *Xyratex Technology, LTD* v. *Teradyne, Inc.*; Newspaper picture that displays the CSO tester; 1990.

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD* v. *Teradyne, Inc.*; Case, "Last products of Disk-File Development at Hursley and Millbrook," IBM, Oct. 12, 1990.

Exhibit 1315 in *Xyratex Technology, LTD* v. *Teradyne, Inc.*; Case, "History of Disk-File Development at Hursley and Millbrook," IBM, Oct. 17, 1990.

*Xyratex Technology, LTD* v. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, LTD* v. *Teradyne, Inc.*, Amended Joint Trial Exhibit List of Xyratex and Teradyne. Case No. CV 08-04545 SJO (PLAx), Nov. 12, 2009.

European Examiner Nora Lindner, Notification of Transmittal of the International Search Report and the Written Opinion of the International Searching Authority, or the Declaration, for International Application No. PCT/GB2005/003490, Jan. 26, 2006, 10 pages.

Abraham et al., "Thermal Proximity Imaging of Hard-Disk Substrates", IEEE Transactions on Mathematics 36:3997-4004, Nov. 2000.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_mati.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.
Bair et al., "Measurements of Asperity Temperatures of a Read/Write Head Slider Bearing in Hard Magnetic Recording Disks", Journal of Tribology 113:547-554, Jul. 1991.
Bakken et al., "Low Cost, Rack Mounted, Direct Access Disk Storage Device", www.ip.com, 4 pages, Mar. 3, 2005.
Biber et al., "Disk Drive Thermal Management", Advances in Electronic Packaging vol. 1:43-46, 1995.
Christensen, "How Can Great firms Fail? Insights from the hard Disk Drive Industry", Harvard Business School Press, pp. 1-26, 2006.
Chung et al., "Vibration Absorber for Reduction of the In-plane Vibration in an Optical Disk Drive", IEEE Transactions on Consumer Electronics, Vo. 48, May 2004.
Curtis et al., "InPhase Professional Archive Drive Architecture" Dec. 17, 2007 http://www.science.edu/TechoftheYear/Nominees/InPhase/Holographic%20Storage.pdf.
Findeis et al., "Vibration Isolation Techniques Suitable for Portable Electronic Speckle Pattern Interferometry", Proc. SPIE vol. 4704, pp. 159-167, 2002 http://www.ndt.uct.ac.za/Papers/spiendt2002.pdf.
FlexStar Technology, "A World of Storage Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).
Frankovich, "The Basics of Vibration Isolation Using Elastomeric Materials", EARSC, 2005 http://www.isoloss.com/pdfs/engineering/BasicsofVibrationIsolation.pdf.
Grochowski et al., "Future Trends in Hard Disk Drives" IEEE Transactions on Magnetics, vol. 32, No. 3, pp. 1850-1854, May, 1996 http://svn.tribler.org/abc/branches/leo/dataset/preferences/johan/johan-68.pdf.
Gurumurthi et al., "Disk Drive Roadmap from the Thermal Perspective: A Case for Dynamic Thermal Management", International Symposium on Computer Architecture, Proceedings of the $32^{nd}$ Annual International Symposium on Computer Architecture, IEEE Computer Society, pp. 38-49, 2005 http://portal.acm.org/citation.cfm?id=1069807.1069975.
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Haddad et al., "A new Mounting Adapter For Computer Peripherals with Improved Reliability, Thermal Distribution, Low Noise and Vibration Reduction", ISPS, Advances in Information Storage and Processing Systems, 1:97-108, 1995.
HighBeam Research website "ACT debuts six-zone catalytic gas heater. (American Catalytic Technologies offers new heaters)" www.highbeam.com, 4 pages, 1998.
HighBeam Research website "Asynchronous Testing Increases Throughput." www.highbeam.com, 7 pages, 2000.
Annex to Form PCT/ASA/206 Communication Relating to the Results of the Partial International Search, for International Application No. PCT/US2008/086814, dated Apr. 3, 2009, 5 pages.
Notification of Transmittal of the International Search Report and the Written Opinion of the International Searching Authority, or the Declaration, for International Application No. PCT/US2009/039926, Sep. 1, 2009, 13 pages.
Notification of Transmittal of the International Search Report and the Written Opinion of the International Searching Authority, or the Declaration, for International Application No. PCT/US2009/039591, Aug. 31, 2009, 10 pages.
Notification of Transmittal of the International Search Report and the Written Opinion of the International Searching Authority, or the Declaration, for International Application No. PCT/US2008/086814, Sep. 18, 2009, 17 pages.
Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 24, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Annex to Form PCT/ASA/206 Commmunication Relating to the Results of the Partial International Search, for International Application No. PCT/US2008/086809, dated Apr. 3, 2009, 2 pages.

* cited by examiner

US 8,160,739 B2

TRANSFERRING STORAGE DEVICES WITHIN STORAGE DEVICE TESTING SYSTEMS

CROSS REFERENCE TO RELATED APPLICATIONS

This U.S. patent application is a continuation-in-part of, and claims priority under 35 U.S.C. §120 from, U.S. patent application Ser. No. 12/104,536, filed on Apr. 17, 2008. The disclosures of this prior application is considered part of the disclosure of this application and is incorporated herein by reference in its entirety.

TECHNICAL FIELD

This disclosure relates to transferring storage devices within storage device testing systems.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower test yields and increased manufacturing costs.

Current disk drive testing systems use an operator, a robotic arm, or a conveyer belt to individually feed disk drives to a transfer location for loading into the testing system for testing. A robotic arm of the testing system individually retrieves the disk drives from the transfer location and loads them in test slots for testing.

SUMMARY

One aspect of the disclosure provides a method of transferring storage devices within a storage device testing system that includes actuating an automated transporter (e.g. robotic arm, gantry system, or multi-axis linear actuator) to substantially simultaneously retrieve multiple storage devices presented for testing, and actuating the automated transporter to substantially simultaneously deliver the retrieved storage devices to respective test slots of the storage device testing system and to substantially simultaneously insert each storage device in their respective test slot.

Another aspect of the disclosure provides a method of transferring storage devices within a storage device testing that includes actuating an automated transporter to substantially simultaneously retrieve storage devices from respective test slots of the storage device testing system and actuating the automated transporter to deliver the retrieved storage devices to a station and substantially simultaneously release each storage device at the station.

Implementations the disclosure may include one or more of the following features. In some implementations, the method includes actuating the automated transporter to substantially simultaneously retrieve multiple storage device transporters and actuating the automated transporter to substantially simultaneously retrieve the storage devices using the storage device transporters to carry the storage devices. In some examples, actuating the automated transporter to substantially simultaneously retrieve multiple storage device transporters, actuating the automated transporter to substantially simultaneously retrieve the storage devices presented for testing by carrying each of the storage devices with respective storage device transporters, and actuating the automated transporter to substantially simultaneously deliver the storage device transporters, each carrying one of the storage devices, to the respective test slots. In some examples, the method also includes inserting each storage device transporter substantially simultaneously into its respective test slot, engaging the carried storage device with a respective connector of the storage device testing system. The inserted storage device transporters provides closure of their respective test slots.

In some implementations, the automated transporter uses transporter couplers to engage and couple to the storage device transporters. The transporter couplers arranged in at least a one-dimensional array. The method may include carrying the retrieved storage devices substantially parallel to one another. In such cases, the transporter couplers may be arranged substantially parallel to one another and spaced horizontally and/or vertically from each other (e.g., in a one or multi-dimensional array). In other examples, the couplers are arranged at non-parallel angles with one another.

In some implementations, the storage devices are present in a storage device tote presented to the storage device testing system. The automated transporter retrieves multiple storage devices substantially simultaneously from the storage device tote with corresponding storage device transporters by positioning the storage device transporters below their respective storage devices, lifting the storage devices each off a storage device support of the storage device tote, and carrying the storage devices in the storage device transporters away from the storage device tote.

The automated transporter may include a manipulator configured to transport multiple storage devices. For example, in the case of a robotic arm as the automated transporter, the manipulator is secured to a distal end of the robot arm. The manipulator includes a manipulator body and multiple couplers disposed on the manipulator body and arranged substantially parallel to one another and/or in at least a one-dimensional array. Each coupler is configured to releasably attach to a storage device transporter. In some examples, the manipulator includes first and second connectors or couplers disposed on a manipulator body and arranged in a substantially V-shaped configuration with respect to each other. The couplers are configured to releasably attach to a storage device transporter.

In some implementations, the automated transporter may be actuated to release the storage devices in a storage device tote presented to the storage device testing system. The automated transporter releases multiple storage devices substantially simultaneously in the storage device tote by positioning storage device transporters carrying the respective storage devices above respective storage device supports of the storage device tote, lowering the storage devices onto the storage device supports, and moving the storage device transporters away from the storage device tote.

Another aspect of the disclosure provides a method of transferring storage devices within a storage device testing system includes actuating an automated transporter having a manipulator to retrieve an untested storage device presented for testing. The manipulator is configured to transport multiple storage devices. The method includes actuating the automated transporter to deliver the retrieved untested storage device to a respective test slot of the storage device testing system and insert the untested storage device in its respective test slot for testing.

Implementations of this aspect of the disclosure may include one or more of the following features. In some implementations, the manipulator includes first and second couplers disposed on a manipulator body and arranged in a substantially V-shaped configuration with respect to each other. In other implementations, the couplers are arranged substantially parallel to each other and spaced from one another along one or two directional axis. In additional examples, the first and second couplers are disposed 180 degrees from one another. The couplers are configured to releasably attach to a storage device transporter.

In some examples, the method includes actuating the automated transporter to retrieve a storage device transporter, actuating the automated transporter to retrieve the untested storage device presented for testing by carrying the untested storage device with the storage device transporter, and actuating the automated transporter to deliver the storage device transporter to the respective test slot. The storage device transporter is inserted into the test slots, engaging the carried untested storage device with a respective coupler of the storage device testing system. The inserted storage device transporter provides closure of its respective test slot.

In some implementations, the untested storage device is present in a storage device tote presented to the storage device testing system. The automated transporter retrieves the untested storage device from the storage device tote with the corresponding storage device transporter by positioning the storage device transporter below the untested storage device, lifting the untested storage device off a storage device support of the storage device tote, and carrying the untested storage device in the storage device transporter away from the storage device tote.

In some implementations, the method includes actuating the automated transporter and the manipulator to retrieve a tested storage device from its respective test slot and carrying the tested storage device to a destination location, such as a destination storage device tote. The method may include actuating the automated transporter to retrieve the tested storage device from its respective test slot by actuating the manipulator to engage a respective storage device transporter of the tested storage device and carrying the tested storage device with its respective storage device transporter to the destination location. The method may include actuating the automated transporter to deliver the storage device carried by its respective storage device transporter to a receptacle of a destination storage device tote.

In yet another aspect of the disclosure, a method of transferring storage devices within a storage device testing system includes actuating an automated transporter having a manipulator to retrieve a first storage device housed in a first test slot of the storage device testing system. The manipulator is configured to transport multiple storage devices. The method includes actuating the automated transporter to deliver the retrieved first storage device to a second test slot, actuating the automated transporter to retrieve a second storage device from the second test slot while carrying the first storage device, and actuating the automated transporter to insert the first storage device into the second test slot while carrying the second storage device.

Implementations of this aspect of the disclosure may include one or more of the following features. In some implementations, the method includes actuating the automated transporter to deliver the retrieved second storage device to the first test slot, and actuating the automated transporter to insert the second storage device into the first test slot. The manipulator includes a manipulator body and first and second couplers disposed on the manipulator body. The couplers are arranged substantially parallel to one another or in a substantially V-shaped configuration with respect to each other and are each configured to releasably attach to a storage device transporter. The manipulator transports the first and second storage devices in corresponding releasably attached storage device transporters. In examples where the storage devices are each carried in a corresponding storage device transporter, inserting each storage device into one of the test slots includes inserting the corresponding storage device transporter into the respective test slot, engaging the carried storage device with a respective coupler of the storage device testing system, the inserted storage device transporter providing closure of its respective test slot.

Another aspect of the disclosure provides a storage device testing system that includes an automated transporter, at least one rack about the automated transporter for access by the automated transporter, and multiple test slots housed by each rack. Each test slot is configured to receive a storage device for testing. A transfer station, arranged for access by the automated transporter, presents multiple storage devices for testing. A manipulator attached to the automated transporter includes multiple couplers arranged in at least a one-dimensional array and may be substantially parallel to one another. Each coupler is configured to transport a storage device.

Implementations of this aspect of the disclosure may include one or more of the following features. The manipulator is configured to releasably attach to multiple storage device transporters. In some implementations, the manipulator includes a manipulator body and multiple couplers disposed on the manipulator body. The couplers are spaced from one another in an arrangement that corresponds to a test slot layout, allowing the manipulator to substantially simultaneously service multiple test slots.

In some examples, the transfer station includes a transfer station housing configured to receive and support multiple storage device totes in a presentation position for servicing by the automated transporter. Each storage device tote includes a tote body defining multiple storage device receptacles configured to each house a storage device. The manipulator may include a manipulator body and multiple couplers disposed on the manipulator body. The couplers are spaced from one another in an arrangement that corresponds to a tote receptacle layout, allowing the manipulator to substantially simultaneously service multiple tote storage device receptacles. Each coupler may be arranged substantially parallel to one another for holding storage devices substantially parallel to one another. In some examples, the transfer station includes a conveyor for continuous transporting of storage devices to and from the storage device testing system.

Another aspect of the disclosure provides a manipulator for a storage device testing system that includes a manipulator body and multiple couplers disposed on the manipulator body. The couplers are spaced from one another in an arrangement that corresponds to a storage device servicing layout, allowing the manipulator to substantially simultaneously service multiple storage device at once.

In some implementations, the storage device servicing layout is a test slot layout of the storage device testing system, allowing the manipulator to substantially simultaneously service multiple test slots. The storage device servicing layout may also be a tote receptacle layout, allowing the manipulator to substantially simultaneously service multiple tote storage device receptacles of a tote that carries storage devices. In some implementations, the storage device servicing layout entails arranging the couplers substantially parallel to one another and/or in at least a one-dimensional array according to a coupler spacing, allowing the manipulator to transport storage devices substantially parallel to one another and/or in an array configuration. The storage device servicing layout may entail arranging the couplers in at least a two-dimensional array according to first and second coupler spacings (e.g., horizontal and vertical spacings).

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Bulk feeding of storage devices in a storage device testing system is advantageous over manual individual feeding of storage devices by providing increased through-put and efficiency of the storage device testing system, inter alia. As will be discussed in detail, presenting multiple storage device totes (also referred to as totes), which hold multiple storage devices, to a storage device testing system allows continual storage device testing, disk sorting amongst multiple storage device totes, minimal user intervention, and increased efficiency over current systems, inter alia. Bulk feeding of storage devices in storage device totes provides the advantage of shop floor flexibility (e.g. by providing the ability to easily redirect a storage device tote or a cart or trolley carrying storage device totes versus rerouting fixed conveyors). An operator can present a batch of drives (e.g. via the storage device tote) to the storage device testing system and then walk away to service another system. Bulk feeding of storage devices in storage device totes also allows automatic sorting of tested drives with the storage device totes, as will be discussed below.

A storage device, as used herein, includes disk drives, solid state drives, memory devices, and any device that requires asynchronous testing for validation. A disk drive is generally a non-volatile storage device which stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 1:
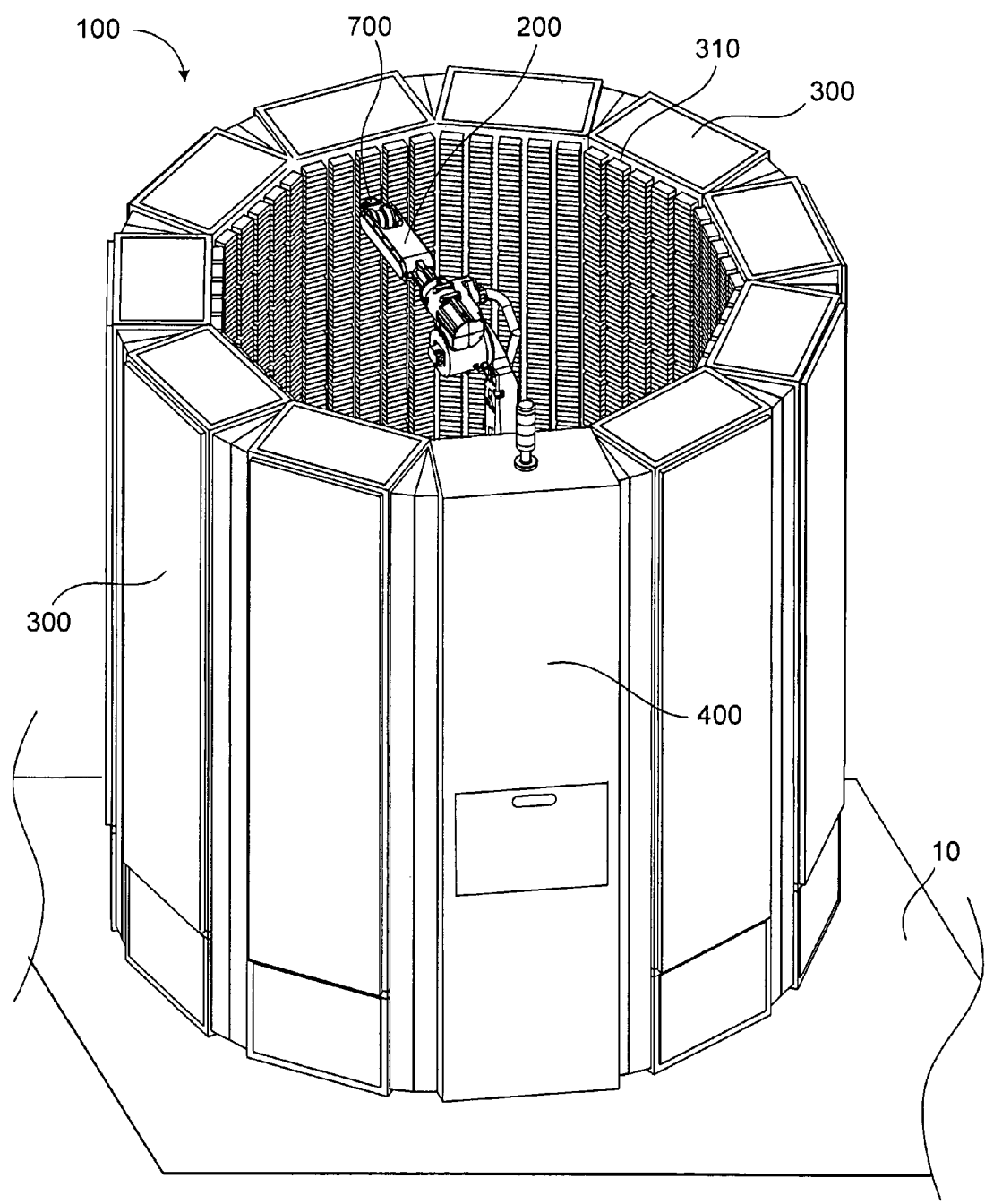
FIG. 1 is a perspective view of a storage device testing system and a transfer station.
Figure 2:
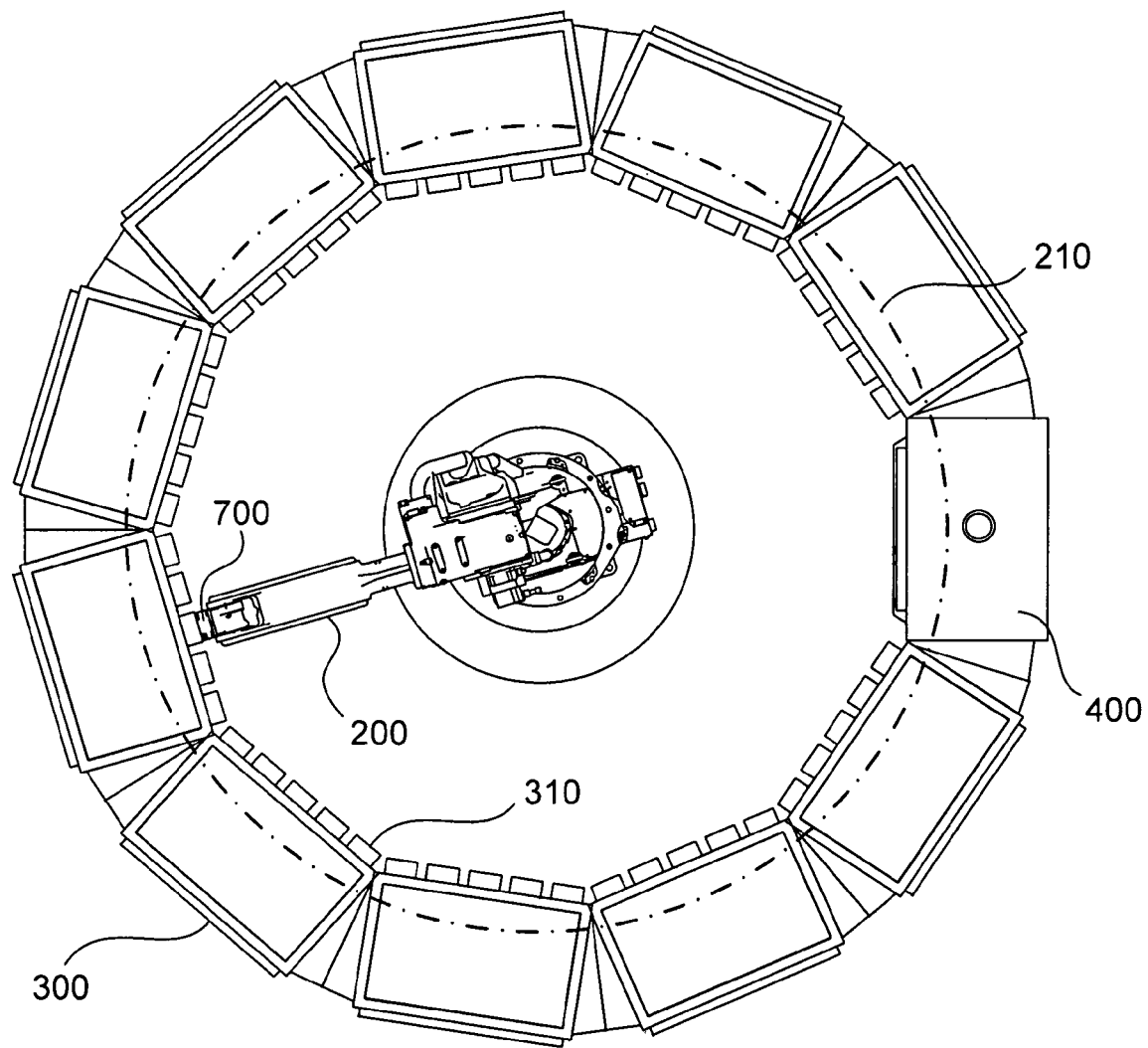
FIG. 2 is a top view of a storage device testing system and a transfer station.
Figure 3:
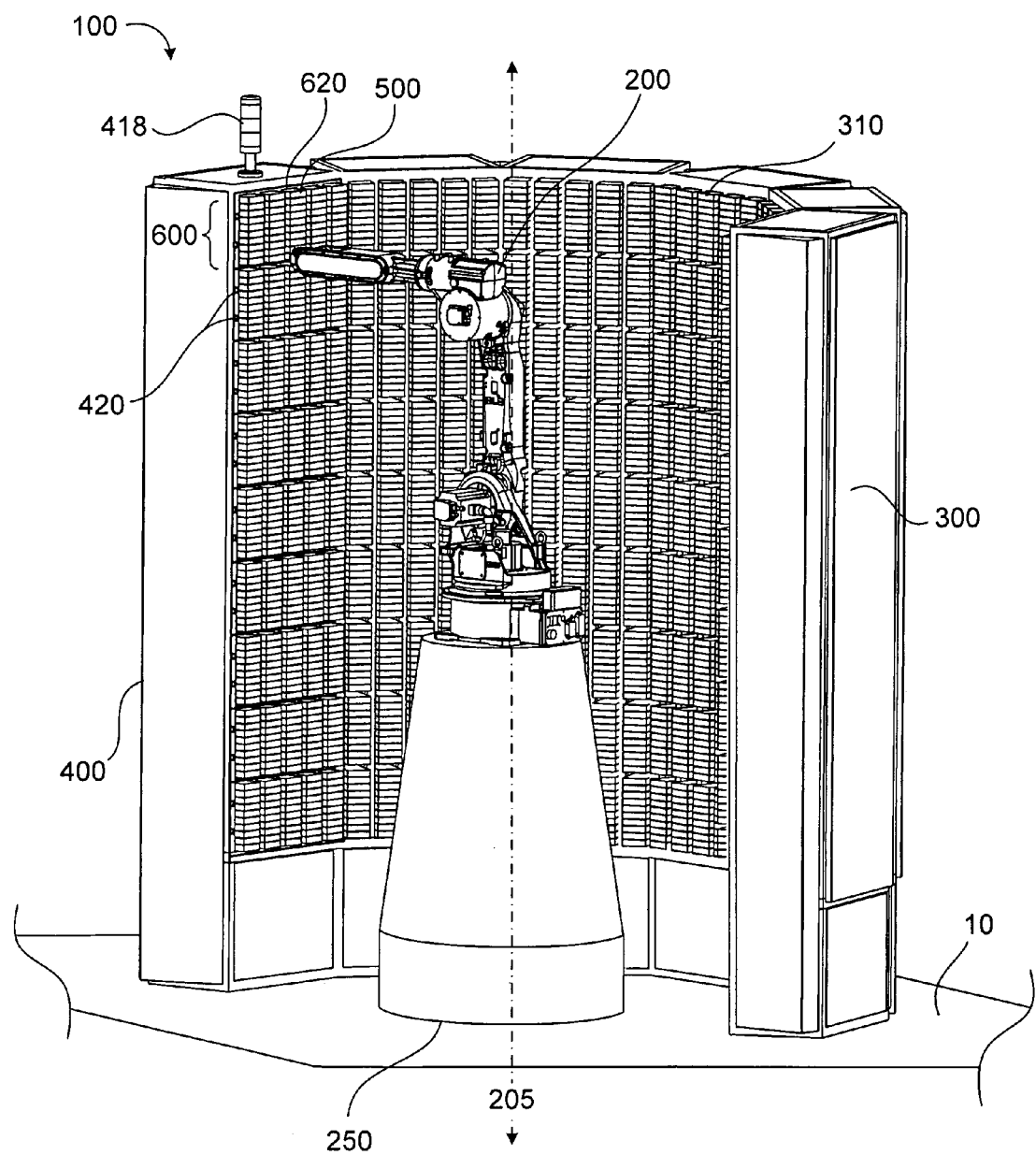
FIG. 3 is a perspective view of a storage device testing system and a transfer station.

Referring to FIGS. 1-3, in some implementations, a storage device testing system 100 includes at least one automated transporter 200 (e.g. robotic arm, gantry system, or multi-axis linear actuator) defining a first axis 205 (see FIG. 3) substantially normal to a floor surface 10. In the examples shown, the automated transporter 200 comprises a robotic arm 200 operable to rotate through a predetermined arc about the first axis 205 and to extend radially from the first axis 205. The robotic arm 200 is operable to rotate 360° about the first axis 205 and includes a manipulator 700 disposed at a distal end of the robotic arm 200 to handle one or more storage devices 500 and/or storage device transporters 550 to carry the storage devices 500 (see e.g. FIGS. 5-6). Multiple racks 300 are arranged around the robotic arm 200 for servicing by the robotic arm 200. Each rack 300 houses multiple test slots 310 configured to receive storage devices 500 for testing. The robotic arm 200 defines a substantially cylindrical working envelope volume 210, with the racks 300 being arranged within the working envelope 210 for accessibility of each test slot 310 for servicing by the robotic arm 200. The substantially cylindrical working envelope volume 210 provides a compact footprint and is generally only limited in capacity by height constraints. In some examples, the robotic arm 200 is elevated by and supported on a pedestal or lift 250 on the floor surface 10. The pedestal or lift 250 increases the size of the working envelope volume 210 by allowing the robotic arm 200 to reach not only upwardly, but also downwardly to service test slots 310. The size of the working envelope volume 210 can be further increased by adding a vertical actuator to the pedestal or lift 250.

The automated transporter 200 (e.g. robotic arm) is configured to independently service each test slot 310 to provide a continuous flow of storage devices 500 through the testing system 100. A continuous flow of individual storage devices 500 through the testing system 100 allows random start and stop times for each storage device 500, whereas other systems that require batches of storage devices 500 to be run all at once as an entire testing loaded must all have the same start and end times. Therefore, with continuous flow, storage devices 500 of different capacities can be run at the same time and serviced (loaded/unloaded) as needed.

Figure 4:
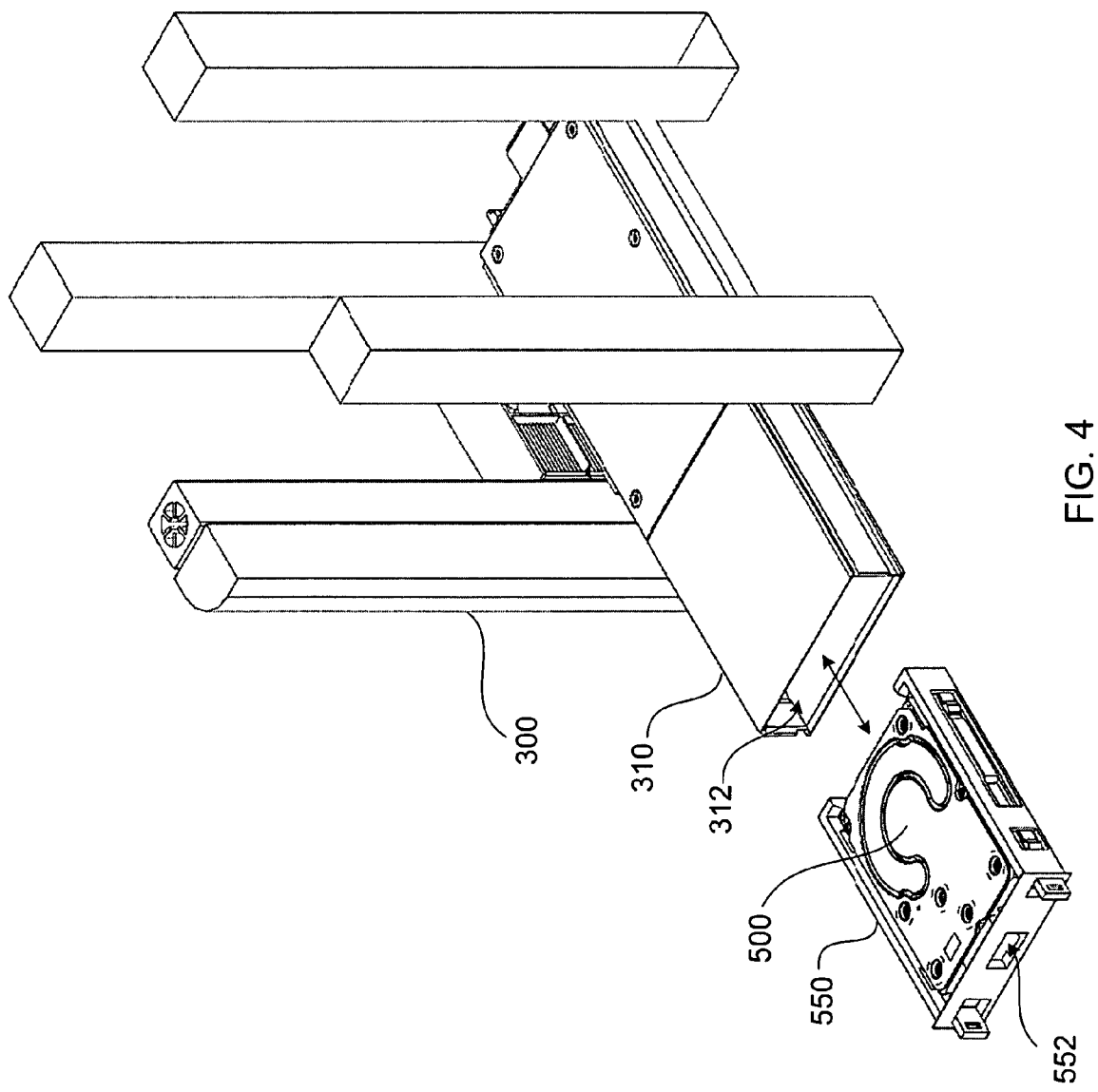
FIG. 4 is a perspective view of a storage device being inserted into a test slot of a storage device testing system.

Referring to FIGS. 3-4, the storage device testing system 100 includes a transfer station 400 configured for bulk feeding of storage devices 500 to the automated transporter 200 (e.g. a robotic arm, as shown). The automated transporter 200 independently services each test slot 310 by transferring a storage device 500 between the transfer station 400 and the test slot 310. The transfer station 400 houses one or more totes 600 carrying multiple storage devices 500 presented for servicing by the automated transporter 200. The transfer station 400 is a service point for delivering and retrieving storage devices 500 to and from the storage device testing system 100. The totes 600 allow an operator to deliver and retrieve a collection of storage devices 500 to and from the transfer station 400. In the example shown in FIG. 3, each tote 600 is accessible from respective tote presentation support systems 420 in a presentation position and may be designated as a source tote 600 for supplying a collection of storage devices 500 for testing or as a destination tote 600 for receiving tested storage devices 500 (or both). Destination totes 600 may be classified as "passed return totes" or "failed return totes" for receiving respective storage devices 500 that have either passed or failed a functionality test, respectively.

In implementations that employ storage device transporters 550 for manipulating storage devices 500, as shown in FIG. 4, the robotic arm 200 is configured to remove a storage device transporter 550 from one of the test slots 310 with the manipulator 700, then pick up a storage device 500 from one the totes 600 presented at the transfer station 400 with the storage device transporter 550, and then return the storage device transporter 550, with a storage device 500 therein, to the test slot 310 for testing of the storage device 500. After testing, the robotic arm 200 retrieves the tested storage device 500 from the test slot 310, by removing the storage device transporter 550 carrying the tested storage device 500 from the test slot 310 (i.e., with the manipulator 700), carrying the tested storage device 500 in the storage device transporter 550 to the transfer station 400, and manipulating the storage device transporter 550 to return the tested storage device 500 to one of the totes 600 at the transfer station 400.

Figure 5:
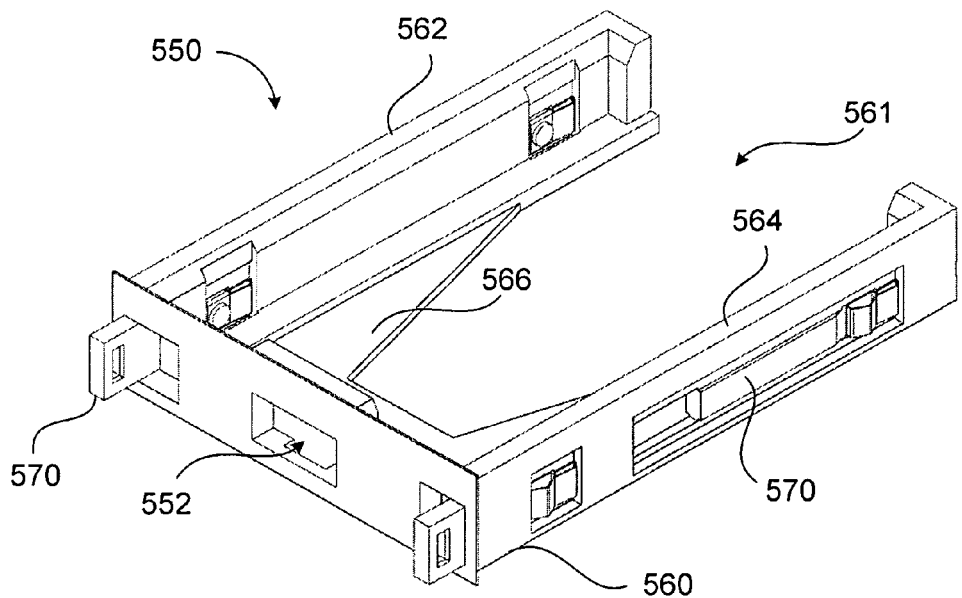
FIG. 5 is a perspective view of a storage device transporter.
Figure 6:
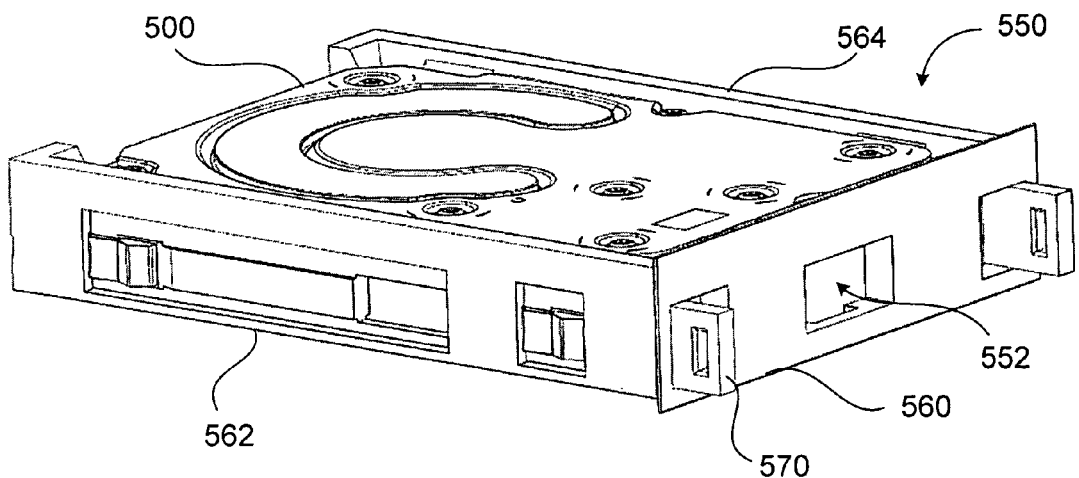
FIG. 6 is a perspective view of a storage device transporter carrying a storage device.
Figure 7:
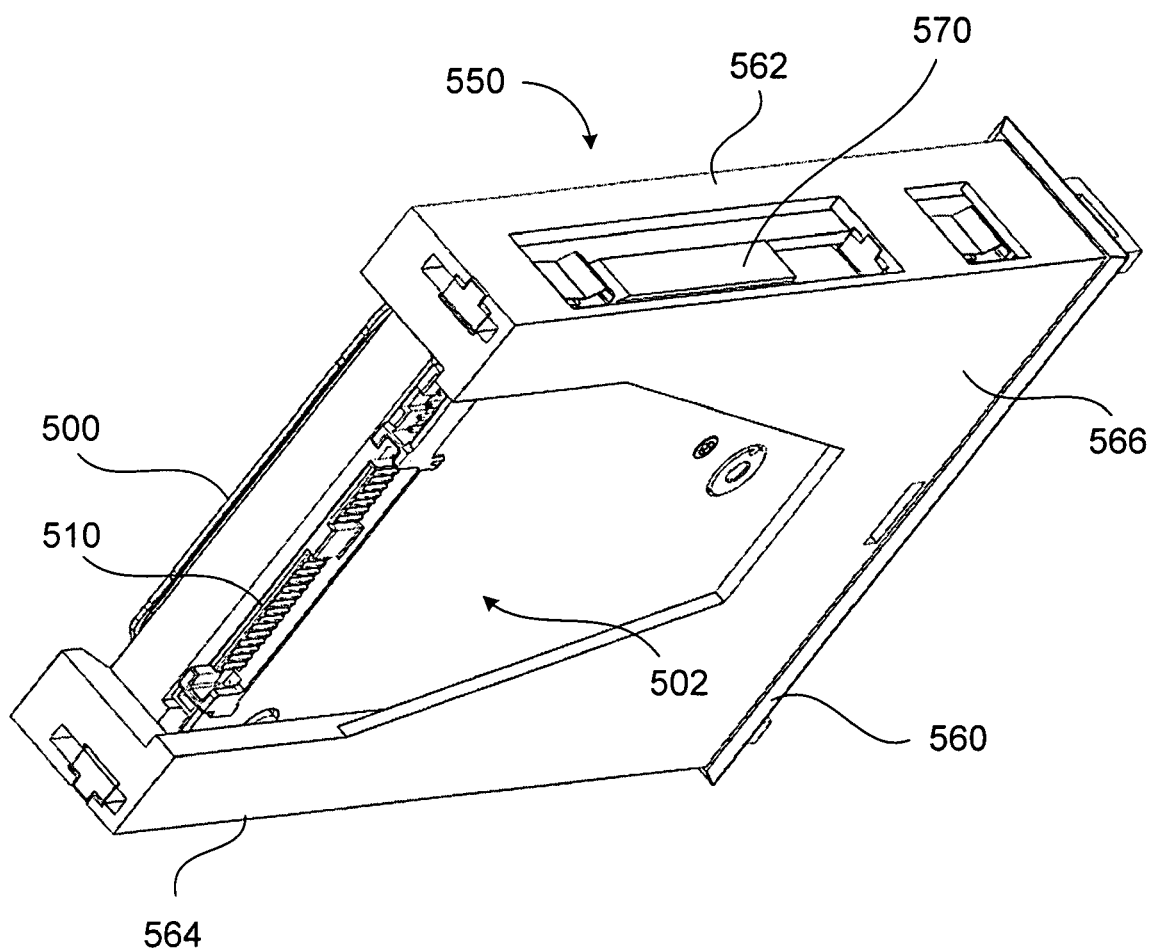
FIG. 7 is a bottom perspective view of a storage device transporter carrying a storage device.
Figure 8:
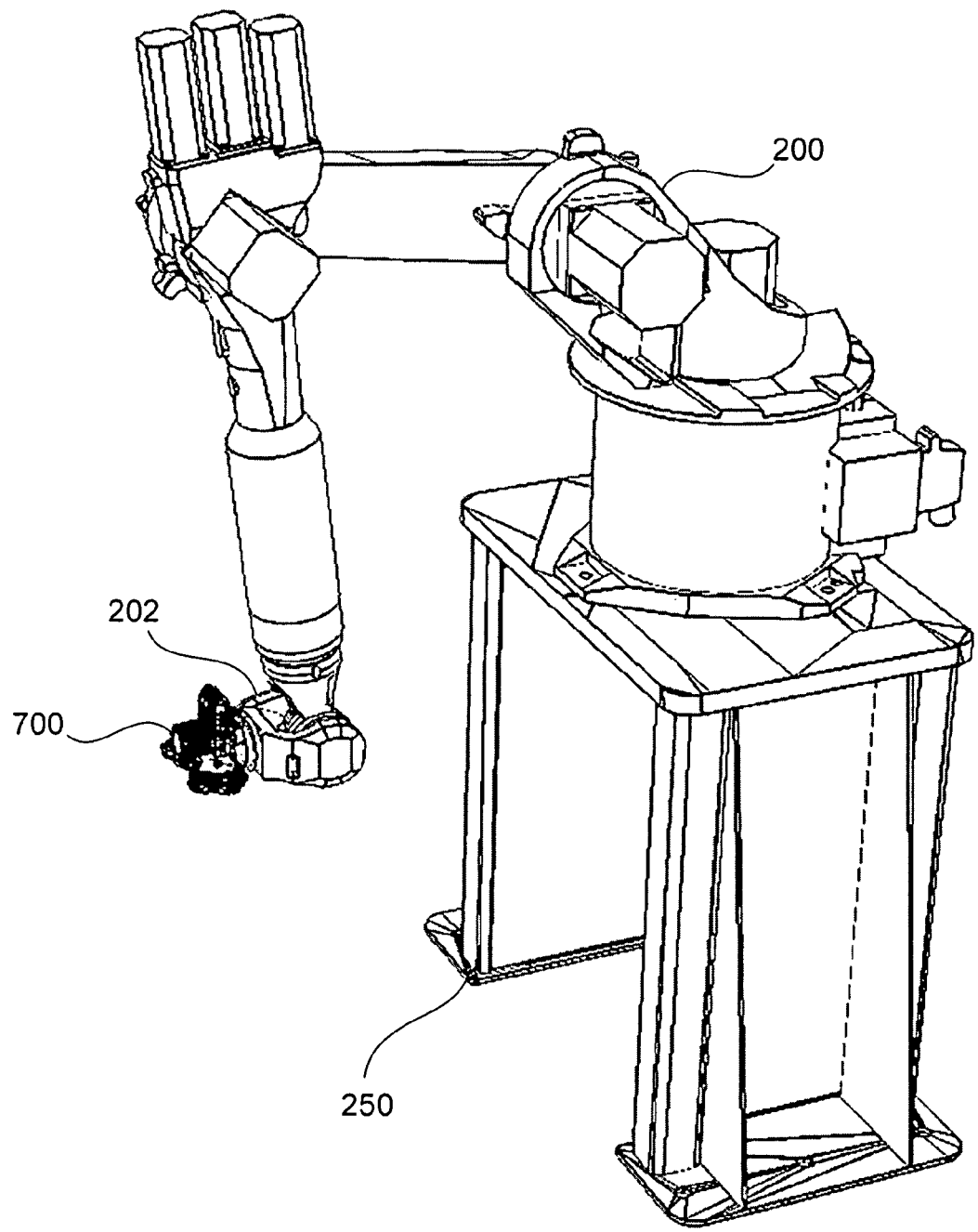
FIG. 8 is a perspective view of a robotic arm with a manipulator secured to its distal end.
Figure 9:
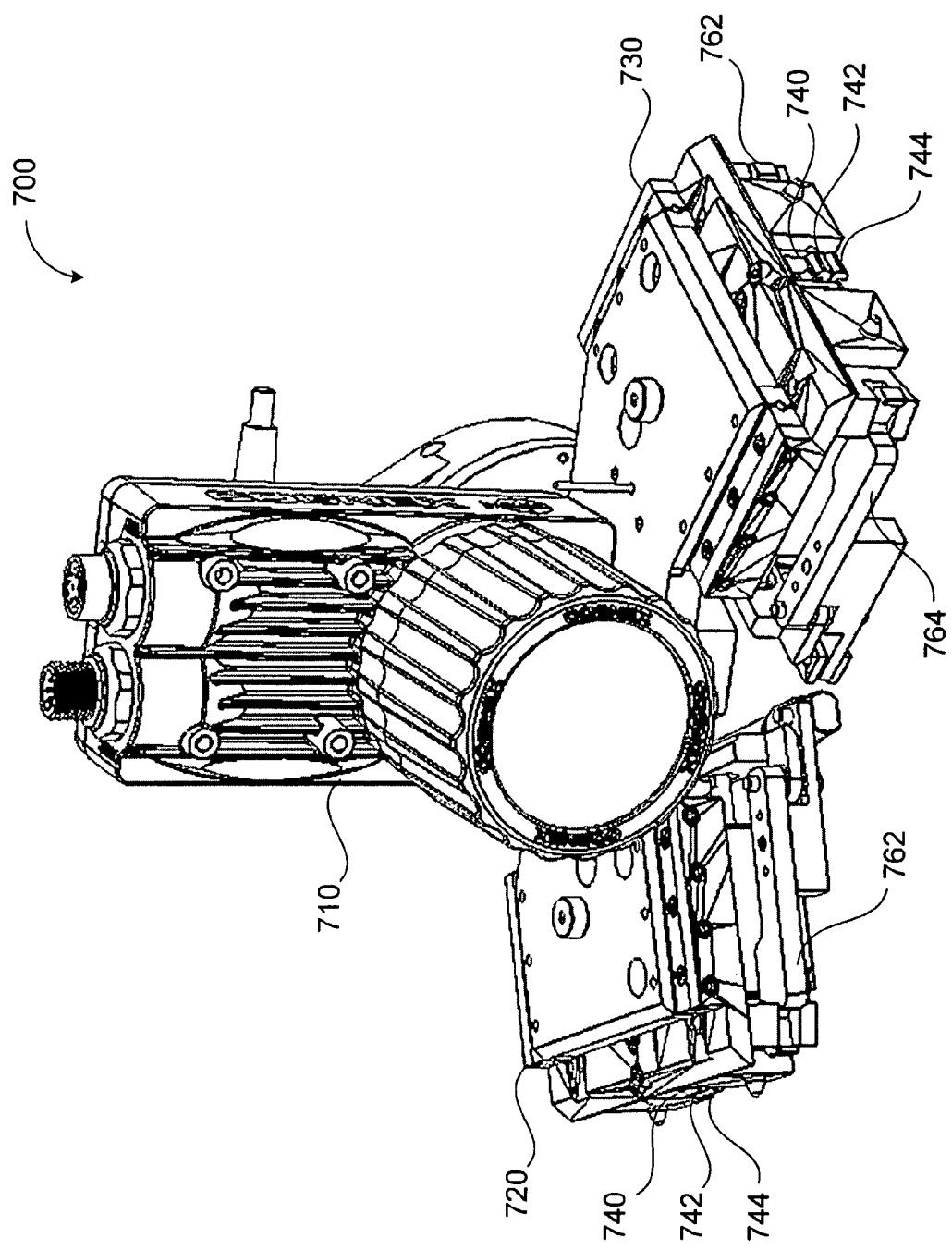
FIG. 9 is an elevated front perspective view of a manipulator for a robotic arm.
Figure 10:
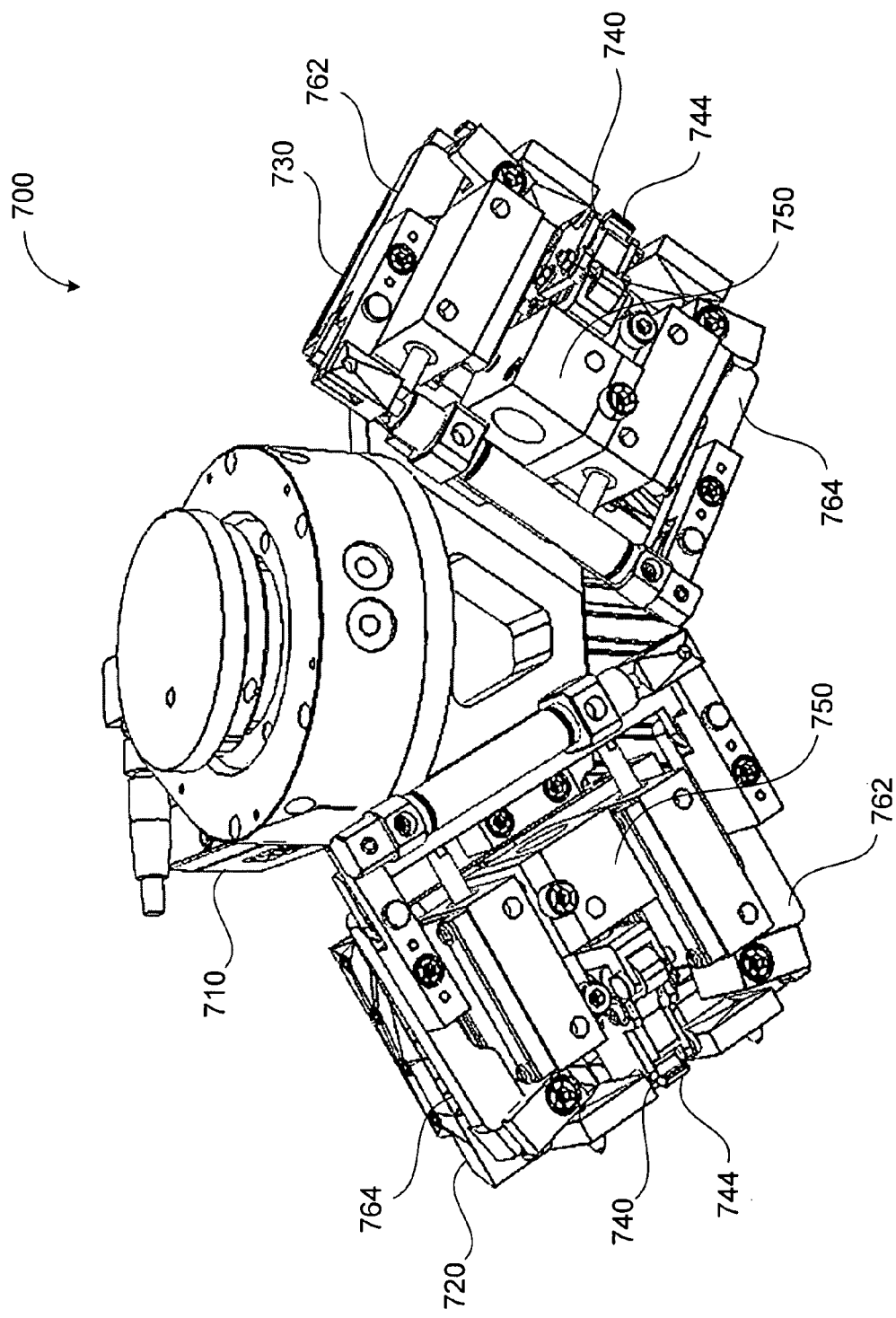
FIG. 10 is a elevated rear perspective view of the manipulator shown in FIG. 9.
Figure 11:
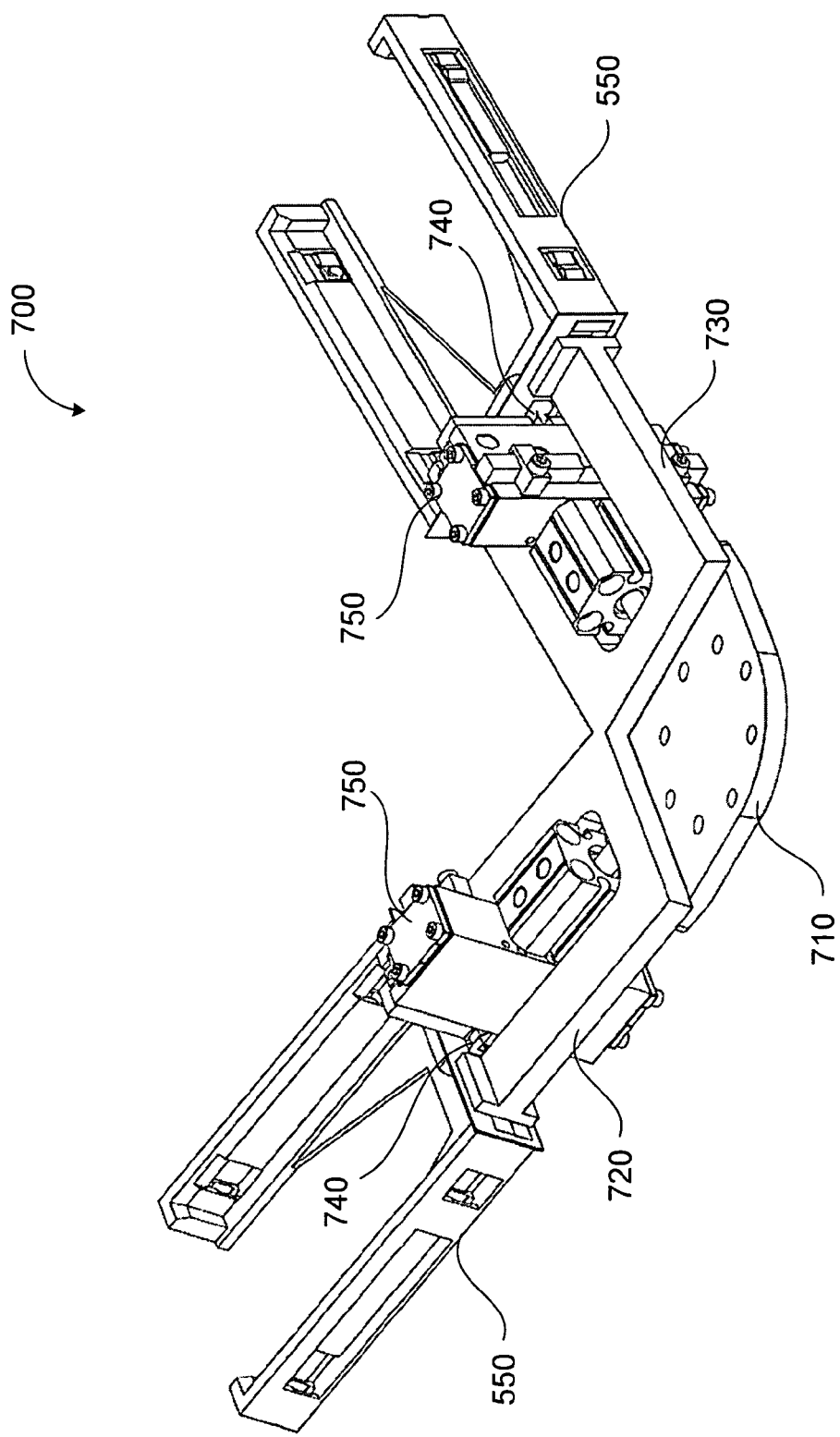
FIG. 11 is an elevated front perspective view of a manipulator for a robotic arm.

The test slot 310, shown in FIG. 4, defines an opening 312 configured to receive the storage device transporter 550, which in this case provides closure of the test slot 310. The storage device transporter 550 is configured to receive the storage device 500, as shown in FIG. 5, and be handled by the automated transporter 200. In use, one of the storage device transporters 550 is removed from one of the test slots 310 with the robot 200 (e.g., by grabbing, or otherwise engaging, the indentation 552 of the transporter 550 with the manipulator 700 of the robot 200). In some examples, as illustrated in FIGS. 5-7, the storage device transporter 550 includes a frame 560 defining a substantially U-shaped opening 561 formed by sidewalls 562, 564 and a base plate 566 that collectively allow the frame 560 to fit around a storage device support (not shown) in the tote 600 so that the storage device transporter 550 can be moved (e.g., via the robotic arm 200) into a position beneath one of the storage devices 500 housed in one of multiple storage device receptacles 620 defined by the tote 600 (see e.g., FIGS. 8-9). The storage device transporter 550 can then be raised (e.g., by the robotic arm 310) into a position engaging the storage device 600 for removal from the tote 600.

With the storage device 500 in place within the frame 560 of the storage device transporter 550, the storage device transporter 550 and the storage device 500 together can be moved by the robotic arm 200 for placement within one of the test slots 310, as shown in FIG. 4. In some implementations, the manipulator 700 is also configured to initiate actuation of a clamping mechanism 570 disposed in the storage device transporter 550. This allows actuation of the clamping mechanism 570 before the transporter 550 is moved from the tote 600 to the test slot 310 to inhibit movement of the storage device 500 relative to the storage device transporter 550 during the move. Prior to insertion in the test slot 310, the manipulator 700 can again actuate the clamping mechanism 570 to release the storage device 500 within the frame 560. This allows for insertion of the storage device transporter 550 into one of the test slots 310, until the storage device 500 is in a test position with a storage device connector 510 engaged with a test slot connector (not shown). The clamping mechanism 570 may also be configured to engage the test slot 310, once received therein, to inhibit movement of the storage device transporter 550 relative to the test slot 310. In such implementations, once the storage device 500 is in the test position, the clamping mechanism 570 is engaged again (e.g., by the manipulator 700) to inhibit movement of the storage device transporter 550 relative to the test slot 310. The clamping of the transporter 550 in this manner can help to reduce vibrations during testing. In some examples, after insertion, the storage device transporter 550 and storage device 500 carried therein are both clamped or secured in combination or individually within the test slot 310.

Referring to FIGS. 8-11, the manipulator 700 is secured to a distal end 202 of the robotic arm 200. In some implementations, the manipulator 700 includes first and second arms 720, 730 disposed on a manipulator body 710. In the examples shown in FIGS. 9-11, the first and second arms 720, 730 and arranged in a substantially V-shaped configuration with respect to each other. In some implementations, the arms 720, 730 can be disposed in other arrangements, such as 180 degrees from each other or some other angle therebetween. The arms 720, 730 each have couplers 740 configured to releasably attach to a storage device transporter 550. In the examples shown, each coupler 740 includes first and second tabs 742, 744 opposedly coupled to a tab actuator 750 disposed on the arm 720,730. The tab actuator 750 is operable to move its coupled tabs 742, 744 in opposing directions to releasably engage and hold a storage device transporter 550. To grab the storage device transporter 550, the robotic arm 200 and manipulator 700 are actuated to maneuver one of the couplers 740 to place the tabs 742, 744 into the indentation 552 of the storage device transporter 550 and then actuate the tab actuator 740 to move the tabs 742, 744 away from each other and engage the indentation 552 to releasable attach to the storage device transporter 550. In some examples, the tabs 742, 744 are hook shaped and/or have friction pads to engage the indentation 552 of the storage device transporter 550. Each arm 720, 730 of the manipulator 700 has first and second clamp actuators 762, 764 configured to engage the clamping mechanism 570 of the storage device transporter 550. The clamp actuators 762, 764 may be operable to push or pull on the clamping mechanism 570 to engage/disengage the clamping mechanism 570.

Figure 12:
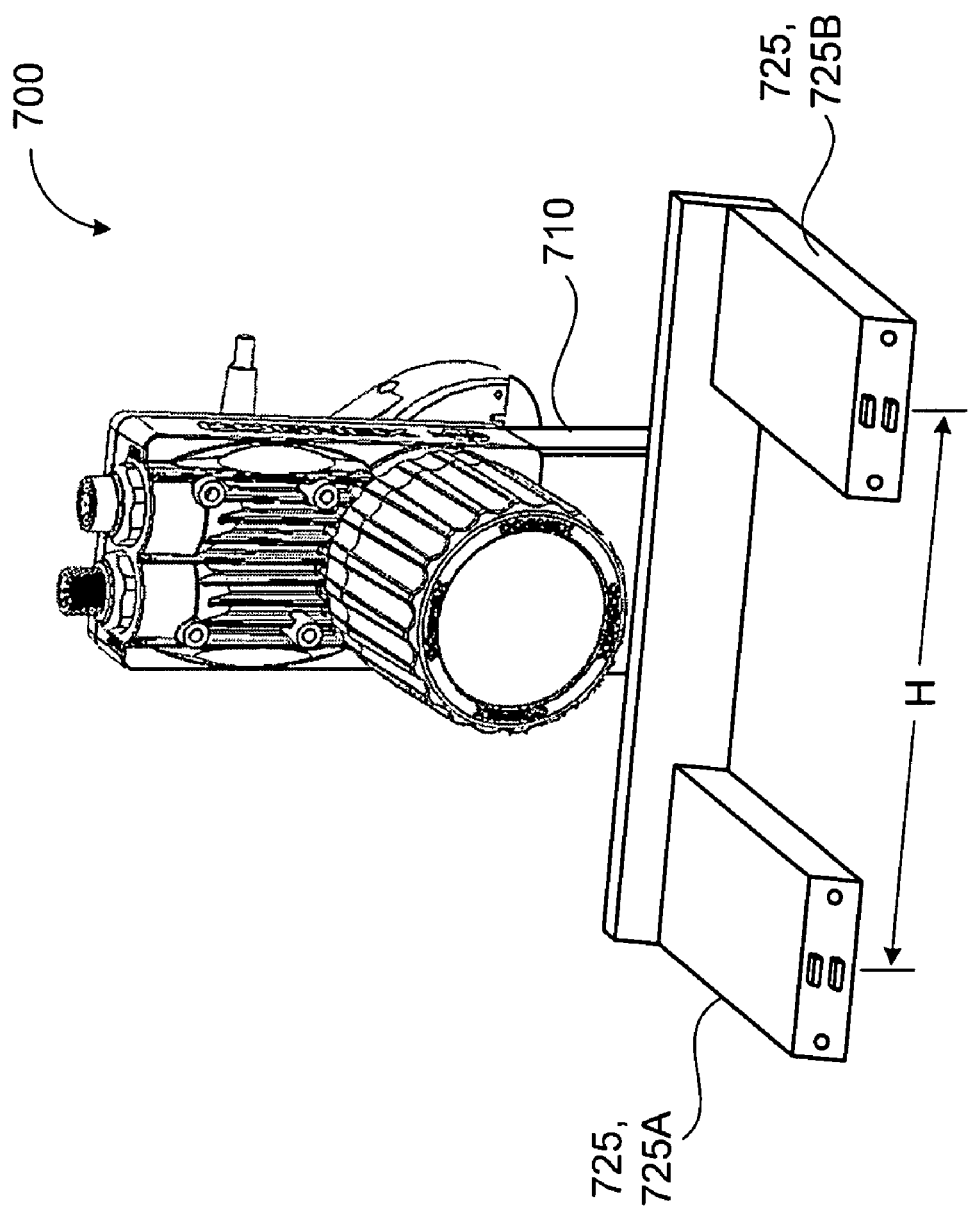
FIG. 12 is a perspective view of a manipulator having two manipulator couplers arranged substantially horizontally spaced apart.
Figure 13:
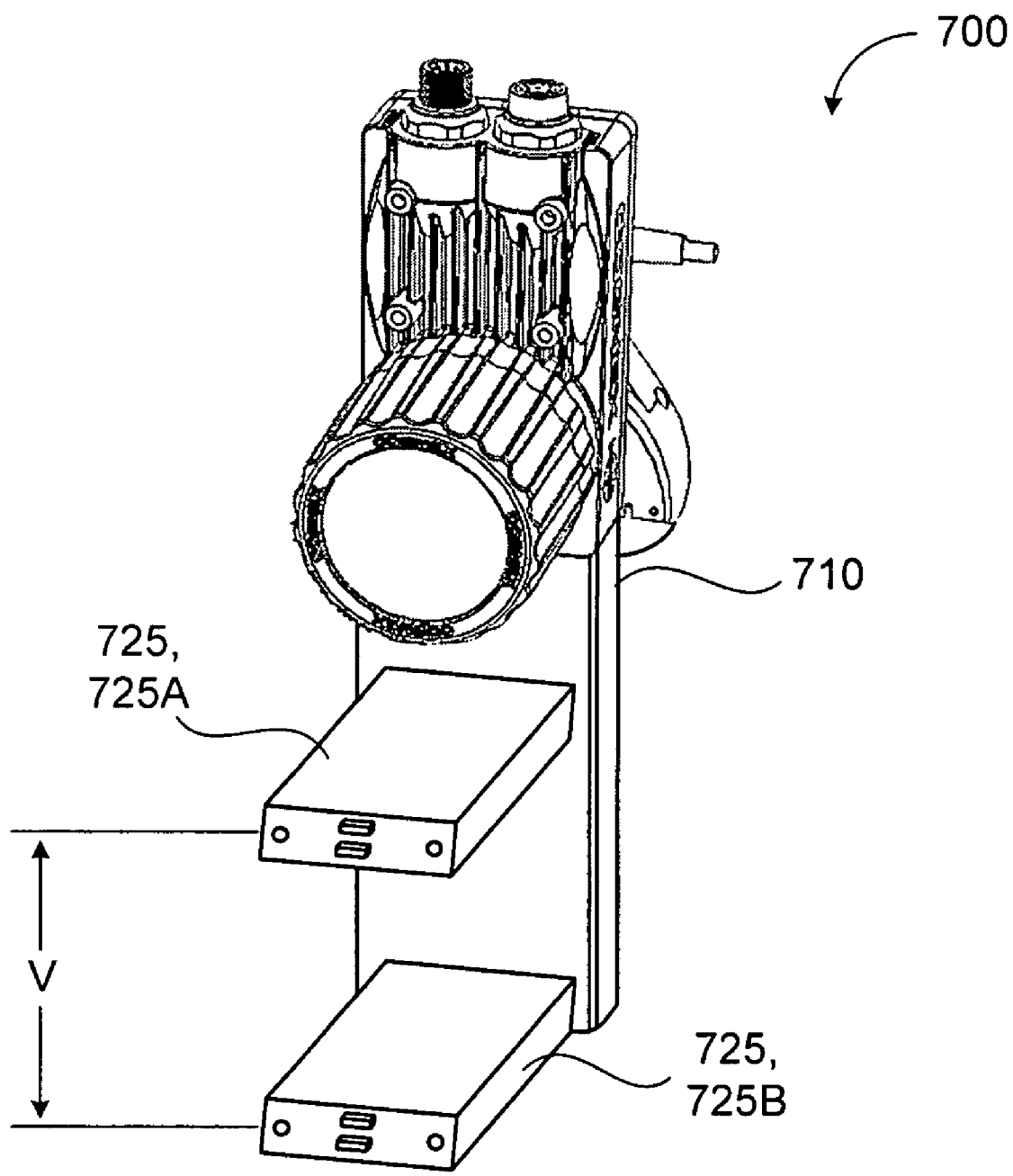
FIG. 13 is a perspective view of a manipulator having two manipulator couplers arranged substantially vertically spaced apart.
Figure 14:
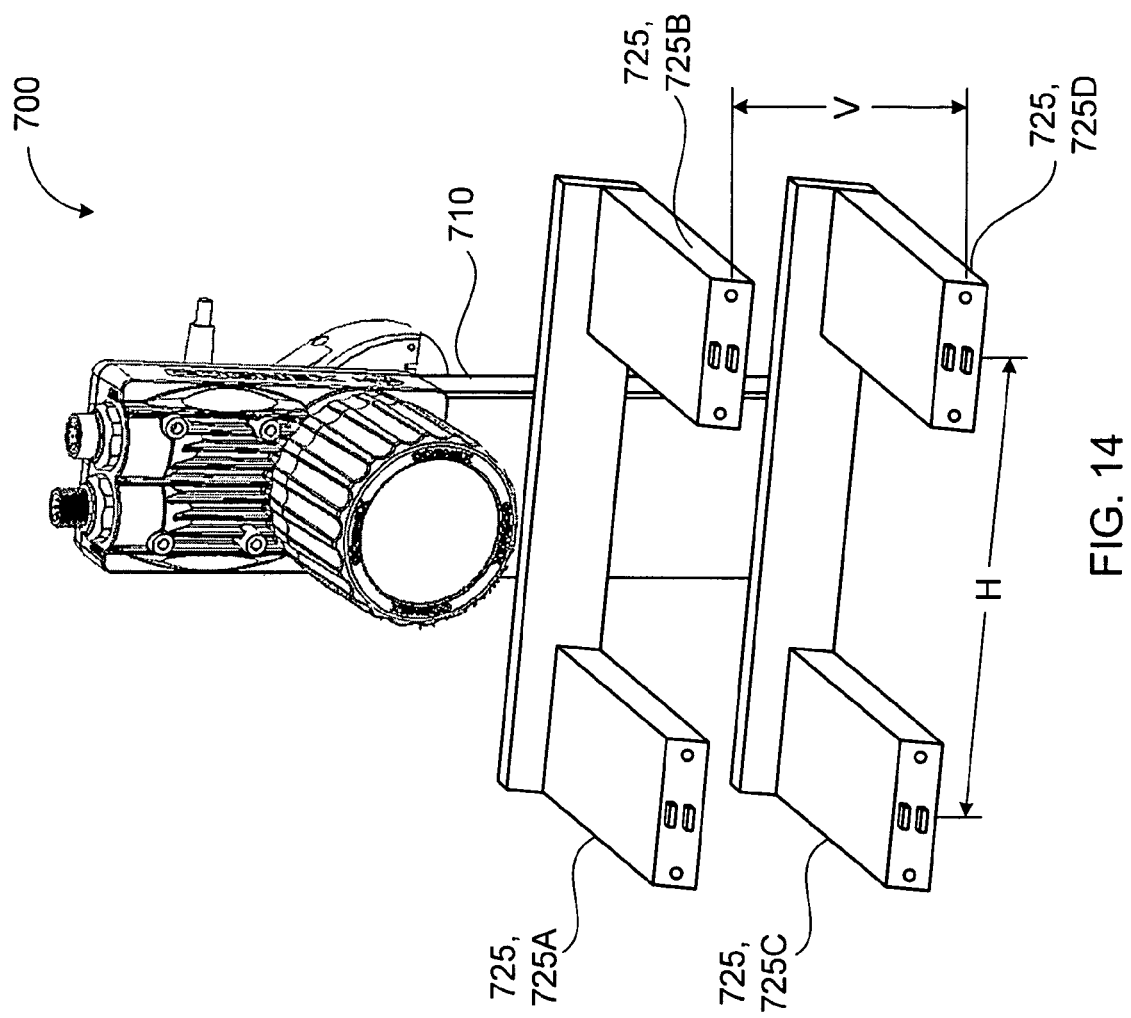
FIG. 14 is a perspective view of a manipulator having multiple manipulator couplers each spaced apart from one another.

Referring to FIGS. 12-14, in some examples, the manipulator 700 includes multiple manipulator couplers 725 disposed on a manipulator body 710 and arranged in substantially the same orientation with respect to each other (e.g., parallel), with each manipulator coupler 725 spaced from one another (e.g., vertically and/or horizontally). FIG. 12 illustrates an example of the manipulator 700 having first and second manipulator couplers 725A, 725B arranged with a horizontal spacing H. FIG. 13 illustrates an example of the manipulator 700 having first and second manipulator couplers 725A, 725B arranged with a vertical spacing V. FIG. 14 illustrates an example of the manipulator 700 having first, second, third, and fourth manipulator couplers 725A, 725B, 725C, 725D arranged with the horizontal spacing H between the first and second couplers 725A, 725B as well as the third and fourth couplers 725C, 725D, and the vertical spacing V between the first and second couplers 725A, 725B and the third and fourth couplers 725C, 725D. In some examples, a third axis of spacing is used to offset various manipulator couplers 725 from others in three directions.

Each manipulator coupler 725 is configured to engage and releasably hold a storage device transporter 550. The manipulator couplers 725 may be arranged to allow the manipulator 700 to deliver and retrieve disc drives 500 from multiple test slots 310 substantially simultaneously. The manipulator couplers 725 are arranged to accommodate the spacing (e.g., single or multi-directional) between one or more groups of test slots 310 (e.g., adjacent and/or non-adjacent test slots 310), such that the robotic arm 200 can maneuver the manipulator 700 to interact with multiple test slots 310 at once. For example, to interact with test slots 310 arranged in columns and rows in the racks 300, the manipulator couplers 725 are arranged with the appropriate spacing(s) H, V such that the manipulator couplers 725 substantially align with respective test slots 310 for delivering or retrieving disc drives 500 and/or transporters 550 to or from the test slots 310. The tote 600 may be configured to accommodate and hold disc drives 500 in an arrangement that spaces the disc drives 500 in same manner as the test slots 310 are arranged in the racks 300. Therefore, the manipulator 700 may interact with totes 600 having storage device receptacles 620 (FIG. 15) and with racks 300 having test slots 310 in same manner, e.g., as when both the storage device receptacles 620 and the test slots 310 are arranged in substantially similar rows and columns. The manipulator couplers 725 may be arranged such that the spacings H, V are multiples of the spacing between adjacent storage device receptacles 620 and/or test slots 310. For example, the manipulator couplers 725 may be arranged so as to retrieve storage devices 500 from non-adjacent storage device receptacles 620 (e.g., first and fourth positions), while delivering the retrieved storage devices 500 to adjacent test slots 310. The converse may be suitable as well.

The manipulator 700 may retrieve or deliver the storage devices 500 or storage device transporters 550 carrying storage devices 500 sequentially, randomly, or substantially simultaneously. The manipulator couplers 725 may retrieve or deliver the storage devices 500 or storage device transporters 550 carrying storage devices 500 into horizontally or vertically adjacent, or horizontally or vertically non-adjacent storage device receptacles 620. Further, the manipulator couplers 725 may retrieve or deliver the storage devices 500 or storage device transporters 550 carrying storage devices 500 into horizontally or vertically adjacent, or horizontally or vertically non-adjacent test slots.

For example, in implementations where the manipulator couplers 725 are spaced horizontally (FIG. 12) with substantially no vertical spacing V (e.g., in a row), the manipulator 700 may deliver and retrieve storage devices 500 to and from storage device receptacles 620 in the same row of the tote 600 as well as deliver and retrieve storage device transporters 550 carrying storage devices 500 to and from test slots 310 in the same row of a rack 300. In another example, in implementations where the manipulator couplers 725 are spaced vertically (FIG. 13) with substantially no horizontal spacing H (e.g., in a row), the manipulator 700 may deliver and retrieve storage devices 500 to and from storage device receptacles 620 in the same column of the tote 600 as well as deliver and retrieve storage device transporters 550 carrying storage devices 500 to and from test slots 310 in the same column of a rack 300. Combinations of these examples are possible as well, such as diagonally spaced manipulator couplers 725. In examples, such as shown in FIG. 14, where the manipulator 700 includes a two dimensional array of manipulator couplers 725, the manipulator 700 can deliver and retrieve storage devices 500 to and from storage device receptacles 620 in the multiple rows and columns of the tote 600 as well as deliver and retrieve storage device transporters 550 carrying storage devices 500 to and from multiple rows and columns test slots 310 of a rack 300

Figure 15:
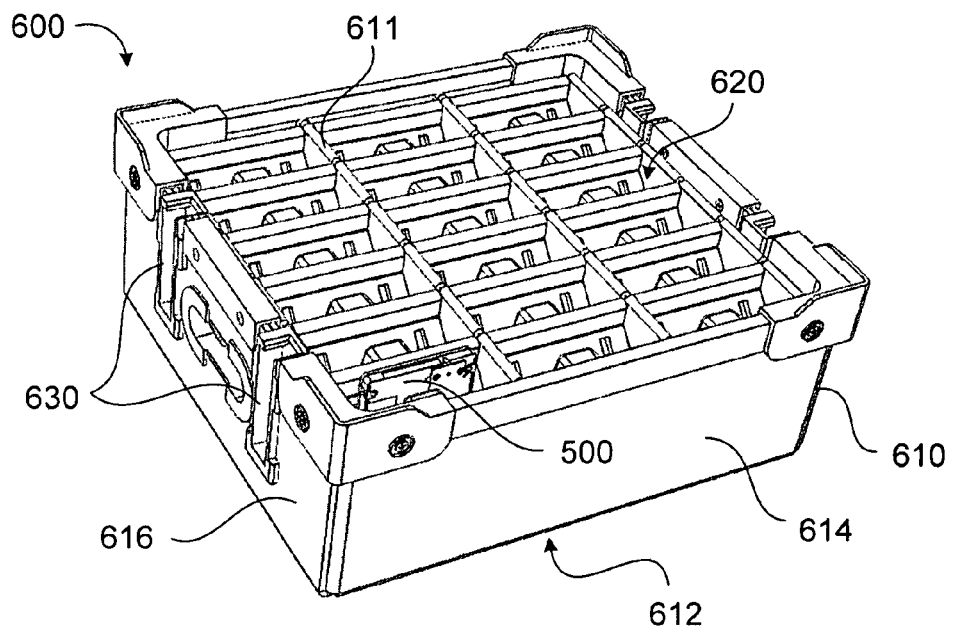
FIG. 15 is a perspective view of a storage device tote in a loading position.
Figure 16:
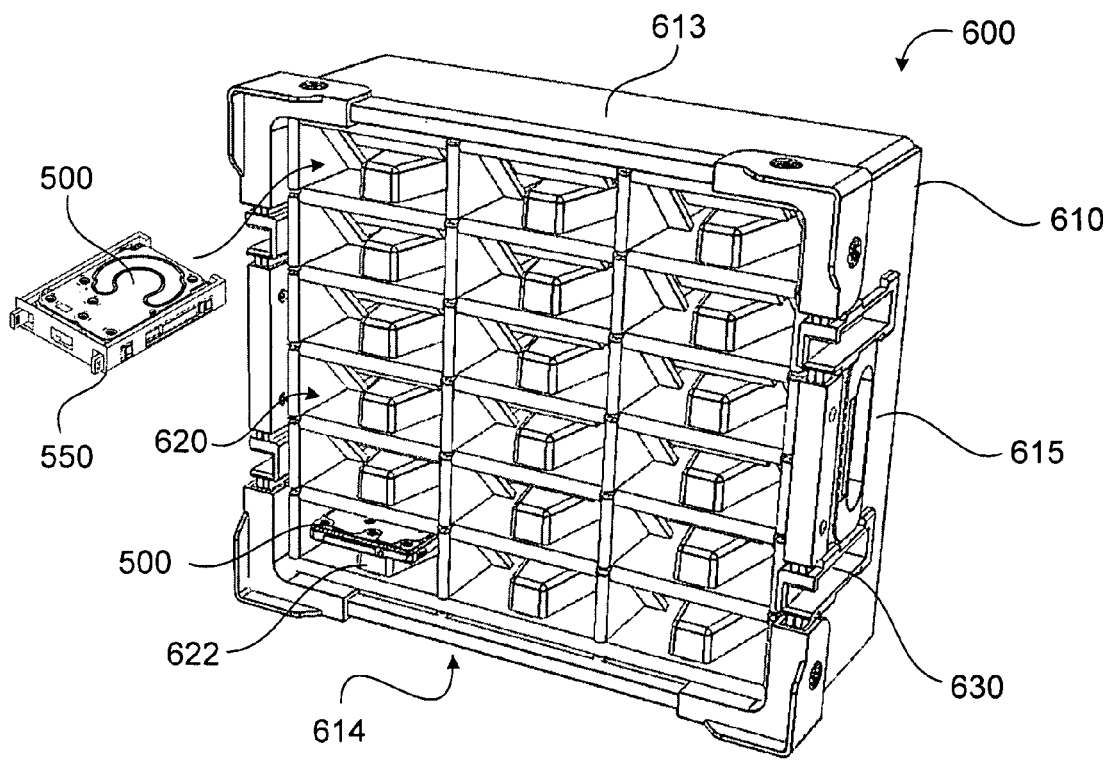
FIG. 16 is a perspective view of a storage device tote in a presentation position.

In the example illustrated in FIGS. 15-16, the tote 600 includes a tote body 610 having a front side 611, a back side 612, a top side 613, a bottom side 614, a right side 615 and a left side 616. The tote body 610 defines multiple storage device receptacles 620 in the front side 611 that are each configured to house a storage device 500. In some examples, the tote 600 rests on its back side 612 while in the loading position, such that the storage device receptacles 620 are substantially vertical and face upward, as shown in FIG. 12. In other examples, the tote 600 is held in another orientation while in the loading position, such as at an incline or in a vertical orientation, as with the presentation position. In the presentation position, the tote 600 rests on its bottom side 614, such that the storage device receptacles 620 are substantially horizontal and face laterally, as shown in FIG. 13. The tote body 610 defines arm grooves 630 in the right and left sides 615, 616 of the tote body 610 that are configured to support the tote 600.

In the example shown, each storage device receptacle 620 includes a storage device support 622 configured to support a central portion 502 (see FIG. 7) of the received storage device 500 to allow manipulation of the storage device 500 along non-central portions. In some implementations, the storage device support 622 is configured to support the storage device 500 at an incline, while the tote 600 is in a substantially vertical orientation, such that the storage device 500 has a tending to slide deeper into the storage device receptacle 620, rather than out of the storage device receptacle 620. To remove a housed storage device 500 from the storage device receptacle 620, the storage device transporter 550 is positioned below the storage device 500 (e.g. by the robotic arm 200) in the storage device receptacle 620 and elevated to lift the storage device 500 off of the storage device support 622. The storage device transporter 550 is then removed from the storage device receptacle 620 while carrying the storage device 500 for delivery to a destination target, such as a test slot 310. In some examples, the storage device receptacle 620 of the tote 600 and the manipulator couplers 725 can be spaced to have substantially the same vertical and/or horizontal spacing of the test slots 310. The manipulator 700 retrieves or delivers multiple storage devices 500 or storage device transporters 550 carrying storage devices 500 substantially simultaneously with multiple manipulator couplers 725 from the storage device receptacles 620 of the tote 600, transports the storage devices 500 or storage device transporters 550 carrying storage devices 500 to one or more racks 300 and substantially simultaneously delivers them to multiple test slots 310. The same procedure may be used in reverse to move storage devices 500 or storage device transporters 550 carrying storage devices 500 from the test slots 310 back to one or more totes 600. In some examples, the manipulator couplers 725 are configured to move in one or more directions (e.g., via single or multi-axis drive or stage) to accommodate different spacings between storage device receptacle 620 and/or test slots 310.

Figure 17:
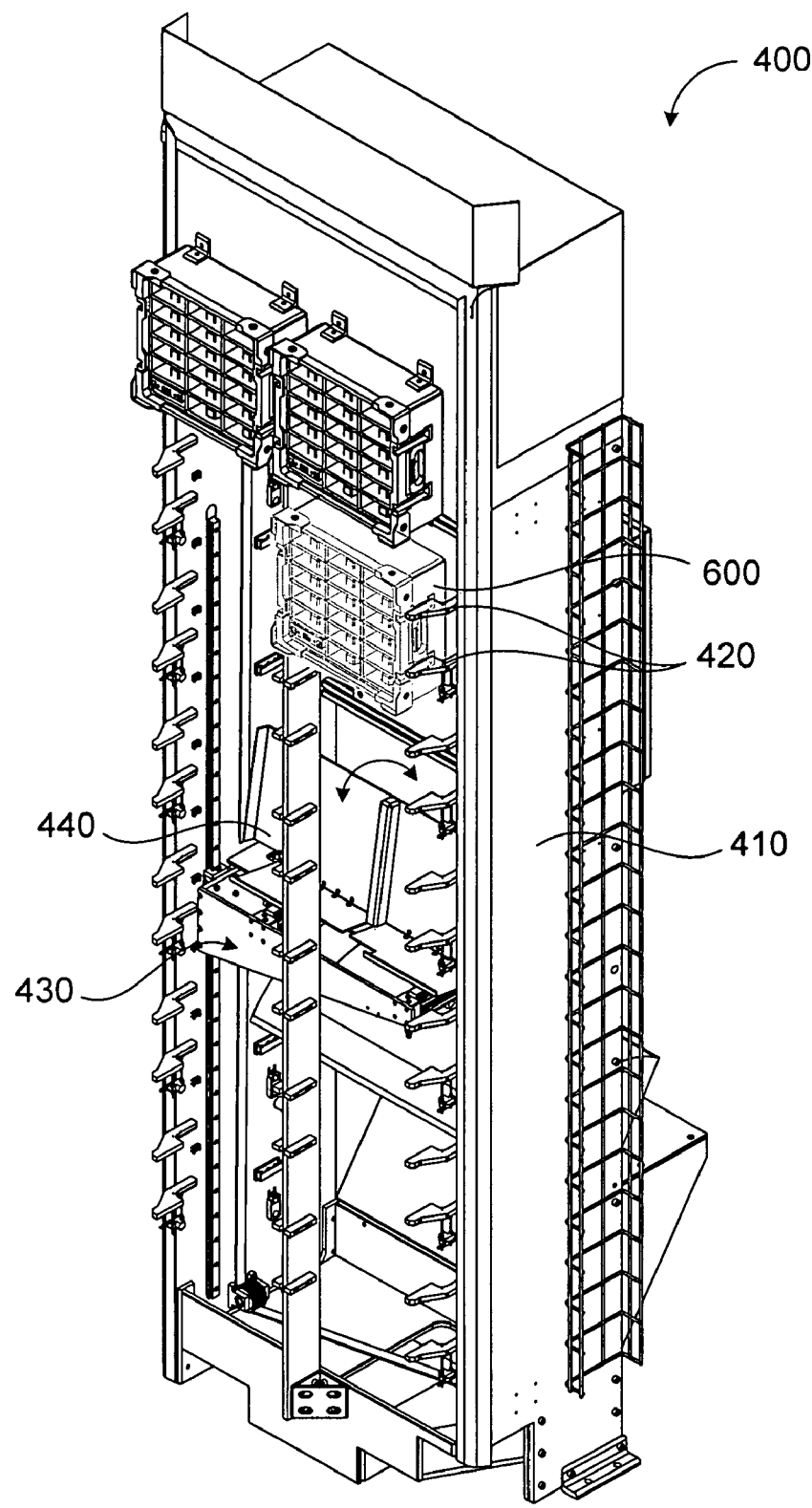
FIG. 17 is a perspective view of a transfer station.

Referring to FIG. 17, in some implementations, the transfer station 400 includes a transfer station housing 410 and multiple tote presentation support systems 420 disposed on the transfer station housing 410. Each tote presentation support system 420 is configured to receive and support a storage device tote 600 in a presentation position for servicing by the storage device testing system 100.

Figure 18:
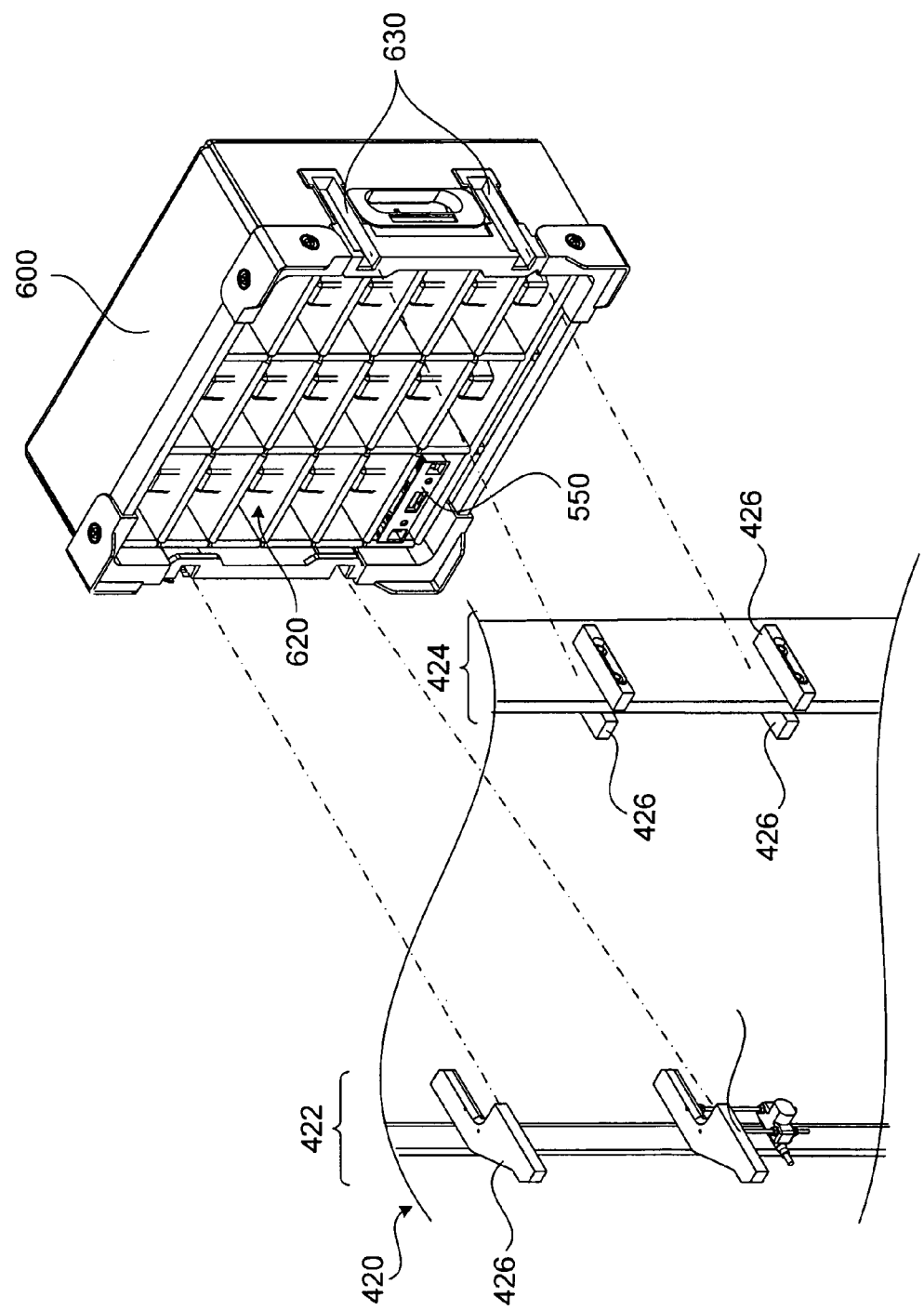
FIG. 18 is a perspective view of a tote in a presentation position for placement on a tote presentation support system of a transfer station.

In some implementations, the tote presentation support systems 420 are each disposed on the same side of the transfer station housing 410 and arranged vertically with respect to each other. Each tote presentation support systems 420 has a different elevation with respect to the others. In some examples, as shown in FIG. 18, the tote presentation support system 420 includes first and second opposing pairs 422, 424 of tote support arms 426 configured to be received by respective arm grooves 630 defined by the tote body 610 of the storage device tote 600.

Referring again to FIG. 17, a tote mover 430 is disposed on the transfer station housing 410 and is configured to move a pivotally coupled tote loading support 440, which is configured to receive and support a storage device tote 600. The tote loading support 440 pivots and moves between a first position and a second position. The tote mover 430 is configured to move the tote loading support 440 between the first position, for holding a storage device tote 600 in a loading position (e.g. in a horizontal orientation at the loading support's first position), and the second position, for holding a storage device tote 600 in the presentation position (e.g. in a substantially vertical orientation) at one of the tote presentation support systems 420 for servicing by the storage device testing system 100 (e.g. by the robotic arm 200). In some examples, the tote presentation support system 420 holds the tote 600 at a slightly inclined (e.g. off vertical) orientation to keep storage devices 500 from accidentally slipping out of the tote 600.

A method of performing storage device testing includes presenting multiple storage devices 500 to a storage device testing system 100 for testing and actuating an automated transporter 200 (e.g. robotic arm) to retrieve one or more storage devices 500 from the storage device tote 600 and deliver the retrieved storage device(s) 500 to corresponding test slots 310 of a rack 300 of the storage device testing system 100. The method includes actuating the automated transporter 200 to insert each storage device 500 in the test slot 310, and performing a functionality test on the storage devices 500 received by the test slot 310. The method may also include actuating the automated transporter 200 to retrieve the tested storage devices 500 from the test slot 310 and deliver the tested storage device 500 back to a destination location. In some implementations, the method includes retrieving multiple presented storage devices 500 and delivering each of the storage devices to a respective test slot 310. In other implementations, the method includes shuffling storage devices 500 amongst test slots 310 by actuating the automated transporter 200 to remove a first storage device 500 from a first test slot 310 and carrying it with a first manipulator couplers 720, moving to a second test slot 310 and removing a second storage device 500 and carrying it with a second manipulator couplers 730, and then inserting the first storage device 500 into the second slot 310. The method may also include actuating the automated transporter 200 to move the second storage device to the first test slot 310 and inserting the second storage device 500 in the first test slot 310. For this mode of operation (storage device shuffling), the dual-armed manipulator 700 provides distinct advantages over a single-armed manipulator by allowing direct exchanges of storage devices 500 at each stop, rather than having to take a storage device 500 out of a first test slot 310, park the storage device 500 in an empty slot 310 or in a tote 600, retrieve another storage device 500 from a second slot 310 and insert that storage device 500 into the first test slot 310, and then retrieve the parked storage device 500 and insert it in the second slot 310. The dual-armed manipulator 700 removes the step of parking one of the storage devices 500 while swapping storage devices 500 amongst two test slots 310.

destination location.

In some implementations, the method includes retrieving multiple presented storage devices 500 substantially simultaneously and delivering each of the storage devices to a respective test slot 310 substantially simultaneously. The method may includes shuffling storage devices 500 amongst test slots 310 by actuating the automated transporter 200 to remove a set of storage devices 500 from a first set of test slots 310, via multiple manipulator couplers 725, carrying them to a second set of test slots 310 and deliver them substantially simultaneously to the second set of test slots 310. Alternatively, the automated transporter 200 can deliver the set of storage devices 500 to a set of storage device receptacles 620 of a tote 600. Similarly, the method may include retrieving a set of storage devices 500 from a set of storage device receptacles 620 of a tote 600 substantially at once and deliver the set (all of them substantially at once) to multiple test slots 310.

Presenting multiple storage devices 500 for testing may be achieved by loading multiple storage devices 500 into/onto a transfer station 400, as by loading the storage devices 500 into storage device receptacles 620 defined by a storage device tote 600, and loading the storage device tote 600 into/onto the transfer station 400. A tote mover 430 of the transfer station 400 is actuated to move the storage device tote 600 from a loading position to a presentation position for servicing by the storage device testing system 100. The storage device tote 600 is supported in the presentation position by one of multiple tote presentation support systems 420 disposed on the transfer station housing 410 and arranged vertically with respect to each other. Multiple storage device totes 600, each housing storage devices 500, can be sequentially placed in the loading position on the transfer station 400 and moved by the tote mover 430 to its respective presentation position at one of the multiple tote presentation support systems 420 for servicing by the storage device testing system 100.

In retrieving one or more of the presented storage devices 500 for testing, the method preferably includes actuating the automated transporter 200 to retrieve one or more storage device transporter 550 (e.g. from a test slot 310 housed in a rack 300), and actuating the automated transporter 200 to retrieve one or more storage devices 500 from the transfer station 400 and carry the storage devices 500 in respective storage device transporters 550. The method includes actuating the automated transporter 200 to deliver the storage device transporters 550 carrying the storage devices 500 to respective test slots 310 for performing a functionality test on the storage device 500 housed by the received storage device transporter 550 and the test slot 310. In some examples, delivering the storage device transporters 550 to the test slots 310 includes inserting the storage device transporters 550 carrying the storage devices 500 into the test slots 310 in the rack 300, establishing an electric connection between the storage devices 500 and the rack 300. After testing is completed on the storage devices 500, the method includes actuating the automated transporter 200 to retrieve the storage device transporters 550 carrying the tested storage device 500 from the test slots 310 and delivering the tested storage devices 500 back to a destination location, such as a destination storage device tote 600 on the transfer station 400. In some implementations, the rack 300 and two or more associated test slots 310 are configured to move storage devices 500 internally from one test slot 310 to another test slot 310, as in the case where the test slots 310 are provisioned for different kinds of tests.

In some examples, the method includes actuating the automated transporter 200 to deposit the storage device transporter 550 in the test slot 310 after depositing the tested storage device 500 at a destination location (e.g. in a storage device receptacle 620 of a destination storage device tote 600), or repeating the method by retrieving another storage device 500 for testing (e.g. from the storage device receptacle 620 of a source storage device tote 600).

In some implementations, the automated transporter 200 includes a manipulator 700 configured to handle multiple storage devices 500 and/or storage device transporters 550 at once. For example, the automated transporter 200 can retrieve and carry one untested storage device 500 in a storage device transporter 500 held by one arm 720, 730 or manipulator coupler 725 of the manipulator 700, and deliver the untested storage device 500 to a test slot 310. At the test slot 310, the automated transporter 200 removes a storage device transporter 550 carrying a test storage device 500 currently in the test slot 310, before inserting the storage device transporter 550 carrying the untested storage device 500 into the test slot 310 for testing. The automated transporter 200 then delivers the tested storage device 500 to a destination location, such as a receptacle 620 of a destination storage device tote 600. In another example, the automated transporter 200 can retrieve and carry two or more untested storage devices 500, one on each arm 720, 730 or on manipulators coupler 725 of the manipulator 700, and then deliver the two untested storage devices 500 to respective test slots 310 for testing. The automated transporter 700 can then be actuated to retrieve two tested storage devices 500 from their respective slots 310 (e.g. by engaging and removing their respective storage device transporters 550 with the manipulator 700), and deliver the tested storage devices 500 to a destination location, such as two receptacles 620 of one or more destination storage device totes 600. If one tested storage device 500 passed the storage device testing and the other failed, they may be placed in different destination storage device totes 600, such a "passed" storage device tote 600 and a "failed" storage device tote 600.

The manipulator 700 allows the automated transporter 200 to move multiple storage devices 500 and/or storage device transporters 550 within the storage device testing system 100 to accomplish more tasks than previously achievable by a manipulator capable of only handling one storage device 500 and/or storage device transporter 550 at a time. The increased flexibility allows for path planning of the automated transporter 200 to optimize its movements.

Figure 19:
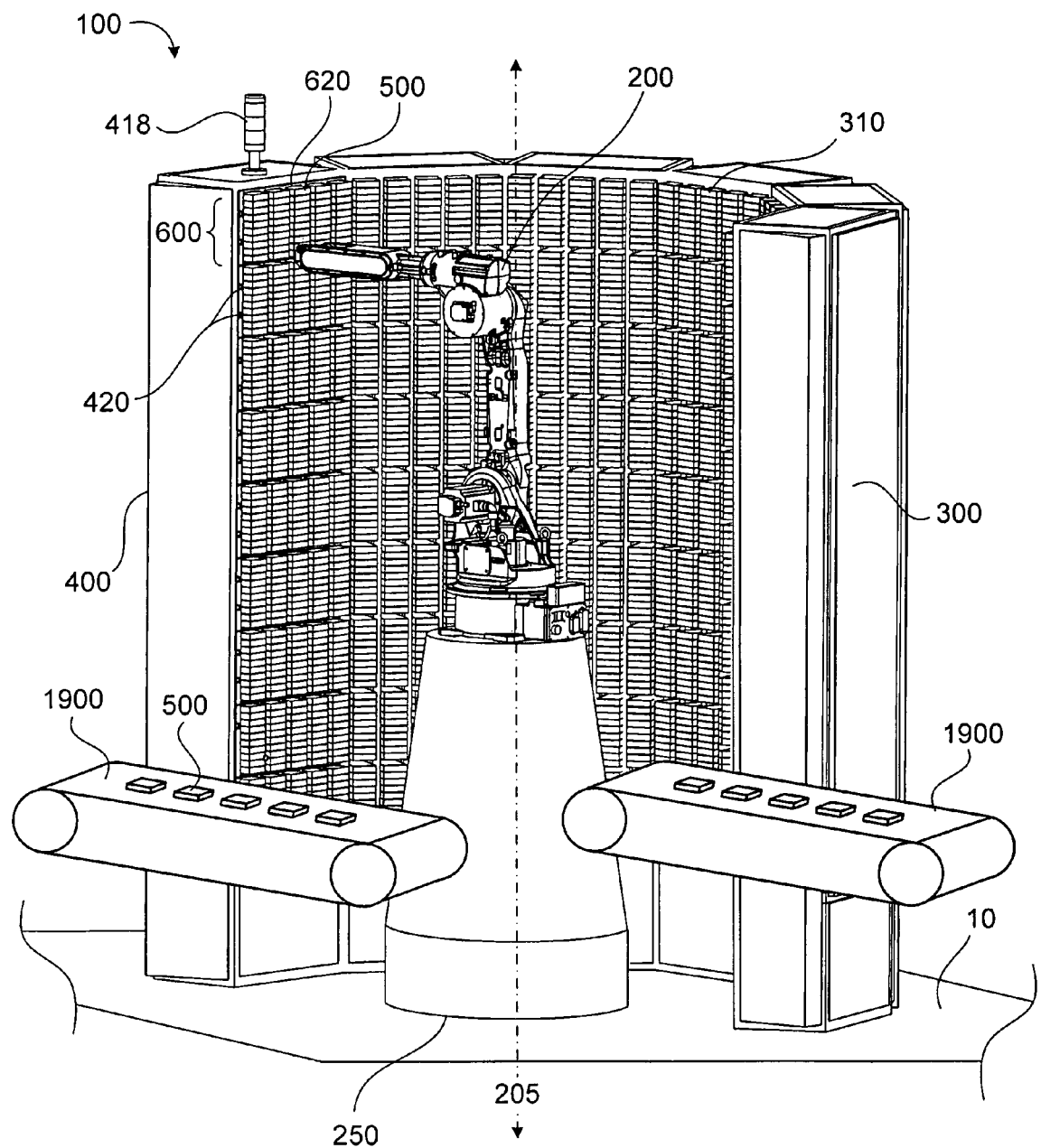
FIG. 19 is a perspective view of a storage device testing system with a conveyor for moving storage devices and/or transporters carrying storage devices.

Referring to FIG. 19, in some implementations, a conveyor 1900 is employed instead of a tote 600 to transport storage devices 500 before, during, or after tests. The conveyor 1900 may be a conveyer belt, an automated assembly that moves storage devices 500, or an operator, inter alia, that arranges storage devices 500 in some sort of presentation system where the manipulator 700 can retrieve multiple storage devices 500. The conveyor 1900 may also include any type of suitable feeding system, automated or operator-based, that presents and/or removes storage devices 500 to/from the storage device testing system 100. The manipulator 700 may remove the storage devices 500 (via the manipulator couplers 725) from the conveyor 1900 and return the storage devices 500 to the conveyor 1900 following a portion of or the completion of the disc drive testing. In some examples, the manipulator 700 includes a linear array of manipulator couplers 725, similar to that shown in FIG. 12, for retrieving and placing multiple disc drives 500 and/or storage device transporters 550 carrying the storage devices 500 to and from the conveyor 1900.

A number of implementations have been described. Nevertheless, it will be understood that various modifications may be made without departing from the spirit and scope of the disclosure. Accordingly, other implementations are within the scope of the following claims.

What is claimed is:

1. A method of transferring storage devices within a storage device testing system, the method comprising:
   actuating an automated transporter to substantially simultaneously retrieve multiple storage devices presented for testing; and
   actuating the automated transporter to substantially simultaneously deliver the retrieved storage devices to respective test slots of the storage device testing system and to substantially simultaneously insert each storage device in their respective test slot.

2. The method of claim 1, further comprising:
   actuating the automated transporter to substantially simultaneously retrieve multiple storage device transporters;
   actuating the automated transporter to substantially simultaneously retrieve the storage devices presented for testing by carrying each of the storage devices with respective storage device transporters; and
   actuating the automated transporter to substantially simultaneously deliver the storage device transporters, each carrying one of the storage devices, to the respective test slots.

3. The method of claim 2, further comprising inserting each storage device transporter substantially simultaneously into its respective test slot, engaging the carried storage device with a respective connector of the storage device testing system, the inserted storage device transporters providing closure of their respective test slots.

4. The method of claim 2, wherein automated transporter uses transporter couplers to engage and couple to the storage device transporters, the transporter couplers arranged in at least a one-dimensional array.

5. The method of claim 4, further comprising carrying the retrieved storage devices substantially parallel to one another.

6. The method of claim 5, wherein the transporter couplers are arranged substantially parallel to one another and spaced at least one of horizontally and vertically from each other.

7. The method of claim 4, wherein the storage devices are presented in a storage device tote presented to the storage device testing system.

8. The method of claim 7, wherein the automated transporter retrieves multiple storage devices substantially simultaneously from the storage device tote with corresponding storage device transporters by positioning the storage device transporters below their respective storage devices, lifting the storage devices each off a storage device support of the storage device tote, and carrying the storage devices in the storage device transporters away from the storage device tote.

9. The method of claim 1, further the automated transporter comprises a manipulator configured to transport multiple storage devices.

10. The method of claim 9, wherein the manipulator comprises:
a manipulator body; and
multiple couplers disposed on the manipulator body and arranged in at least a one-dimensional array, each coupler being configured to releasably attach to a storage device transporter.

11. The method of claim 10, wherein the couplers are arranged substantially parallel to one another for holding storage devices substantially parallel to one another.

12. A method of transferring storage devices within a storage device testing system, the method comprising:
actuating an automated transporter to substantially simultaneously retrieve storage devices from respective test slots of the storage device testing system; and
actuating the automated transporter to deliver the retrieved storage devices to a station and substantially simultaneously release each storage device at the station.

13. The method of claim 12, further comprising:
actuating the automated transporter to substantially simultaneously retrieve multiple storage device transporters;
actuating the automated transporter to substantially simultaneously retrieve the storage devices from their respective test slots using storage device transporters to carry the storage devices.

14. The method of claim 13, wherein the automated transporter uses transporter couplers to engage and couple to the storage device transporters, the transporter couplers arranged in at least a one-dimensional array.

15. The method of claim 14, further comprising carrying the retrieved storage devices substantially parallel to one another.

16. The method of claim 15, wherein the transporter couplers are arranged substantially parallel to one another and spaced at least one of horizontally and vertically from each other.

17. The method of claim 12, wherein the automated transporter comprises a manipulator, the manipulator comprising:
a manipulator body; and
multiple couplers disposed on the manipulator body and arranged at least a one-dimensional array, each coupler being configured to releasably attach to a storage device transporter.

18. The method of claim 12, further comprising releasing the storage devices in a storage device tote presented to the storage device testing system.

19. The method of claim 18, wherein the automated transporter releases multiple storage devices substantially simultaneously in the storage device tote by positioning storage device transporters carrying the respective storage devices above respective storage device supports of the storage device tote, lowering the storage devices onto the storage device supports, and moving the storage device transporters away from the storage device tote.

20. A storage device testing system comprising:
an automated transporter;
at least one rack arranged about the automated transporter for access by the automated transporter;
multiple test slots housed by each rack, each test slot being configured to receive a storage device for testing;
a transfer station arranged for access by the automated transporter, the transfer station presenting multiple storage devices for testing; and
a manipulator attached to the automated transporter, the manipulator comprising multiple couplers arranged in at least a one-dimensional array, each coupler being configured to transport a storage device.

21. The storage device testing system of claim 20, wherein each coupler is arranged substantially parallel to one another for holding storage devices substantially parallel to one another.

22. The storage device testing system of claim 20, wherein each coupler is configured to releasably attach to a storage device transporter.

23. The storage device testing system of claim 20, wherein the manipulator comprises:
a manipulator body; and
multiple couplers disposed on the manipulator body and spaced from one another in an arrangement that corresponds to at least one of:
a test slot layout, allowing the manipulator to substantially simultaneously service multiple test slots, and
a tote receptacle layout, allowing the manipulator to substantially simultaneously service multiple tote storage device receptacles of a storage device tote presented to the storage device testing system.

24. The storage device testing system of claim 20, wherein the transfer station comprises a transfer station housing configured to receive and support multiple storage device totes in a presentation position for servicing by the automated transporter, wherein each storage device tote comprises a tote body defining multiple storage device receptacles configured to each house a storage device.

25. The storage device testing system of claim 20, wherein the transfer station comprises a conveyor.

26. A manipulator for a storage device testing system, the manipulator comprising:
a manipulator body; and
multiple couplers disposed on the manipulator body and spaced from one another in an arrangement that corresponds to a storage device servicing layout, allowing the manipulator to substantially simultaneously service multiple storage device at once.

27. The manipulator of claim 26, wherein the storage device servicing layout comprises a test slot layout of the storage device testing system, allowing the manipulator to substantially simultaneously service multiple test slots.

28. The manipulator of claim 26, wherein the storage device servicing layout comprises a tote receptacle layout, allowing the manipulator to substantially simultaneously service multiple tote storage device receptacles of a tote that carries storage devices.

29. The manipulator of claim 26, wherein the storage device servicing layout comprises arranging the couplers in at least a one-dimensional array according to a coupler spacing, allowing the manipulator to transport storage devices substantially parallel to one another.

30. The manipulator of claim 29, wherein each coupler is arranged substantially parallel to one another for holding storage devices substantially parallel to one another.

* * * * *